United States Patent
Jo et al.

(10) Patent No.: US 12,436,047 B2
(45) Date of Patent: Oct. 7, 2025

(54) STRETCHABLE FIBER OPTIC PRESSURE SENSORS AND USES THEREOF

(71) Applicant: CORNELL UNIVERSITY, Ithaca, NY (US)

(72) Inventors: Jeyeon Jo, Ithaca, NY (US); Heeju Park, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 18/577,193

(22) PCT Filed: Jul. 7, 2022

(86) PCT No.: PCT/US2022/036289
§ 371 (c)(1),
(2) Date: Jan. 5, 2024

(87) PCT Pub. No.: WO2023/283287
PCT Pub. Date: Jan. 12, 2023

(65) Prior Publication Data
US 2024/0230434 A1 Jul. 11, 2024

Related U.S. Application Data

(60) Provisional application No. 63/219,283, filed on Jul. 7, 2021.

(51) Int. Cl.
*G01L 1/24* (2006.01)
*A43B 3/44* (2022.01)
(Continued)

(52) U.S. Cl.
CPC ............... *G01L 1/243* (2013.01); *A43B 3/44* (2022.01); *A61B 5/1038* (2013.01);
(Continued)

(58) Field of Classification Search
CPC .............................. G01L 1/243; G01B 11/16; A43B 3/44; A61B 5/1038; A61B 5/6807;
(Continued)

(56) References Cited

U.S. PATENT DOCUMENTS 5,293,039 A    3/1994   Mongiols
5,913,245 A    6/1999   Grossman
(Continued)

FOREIGN PATENT DOCUMENTS

CN    112378343 A   *   2/2021   ............ G01B 11/16
EP     0932116 A1       7/1999
(Continued)

OTHER PUBLICATIONS

Wang et al., "A shear and plantar pressure sensor based on fiber-optic bend loss", May 31, 2005, retrieved from https://www.researchgate.net/publication/7577657_A_shear_and_plantar_pressure_sensor_based_on_fiber-optic_bend_loss, 12 pages.
(Continued)

*Primary Examiner* — Octavia Hollington
(74) *Attorney, Agent, or Firm* — Young Basile Hanlon & MacFarlane, P.C.

(57) ABSTRACT

A stretchable fiber optic pressure sensor is a sensing device that uses stretchable optical fibers that deform in response to an applied force. A deformation of a fiber causes a decrease in an intensity or alters a duration of the transmitted light due to a bend, crease, or dent in the fiber. The sensor may be configured to determine a pressure or force as applied by an appendage of a user. Multiple sensors may be configured to be in contact with multiple appendages, such as insoles inserted in shoes to determine walking attributes such as a gait, posture, pace, toe-walking, limping, stumbling, foot drop, swaying, or shuffling of a user. The sensor is configurable to transmit data associated with the applied pressure
(Continued)

or force to a user's mobile device or computer to monitor or diagnose health issues associated with walking attributes determined through the use of the sensor.

20 Claims, 15 Drawing Sheets

(51) Int. Cl.
  *A61B 5/00*     (2006.01)
  *A61B 5/103*    (2006.01)
  *G01B 11/16*    (2006.01)
  *G01N 33/36*    (2006.01)

(52) U.S. Cl.
  CPC ............ *A61B 5/6807* (2013.01); *G01B 11/16* (2013.01); *G01N 33/367* (2013.01); *A61B 2560/0214* (2013.01); *A61B 2562/0266* (2013.01); *A61B 2562/043* (2013.01); *A61B 2562/164* (2013.01); *A61B 2562/166* (2013.01); *G01N 2223/615* (2013.01)

(58) Field of Classification Search
  CPC .... A61B 2560/0214; A61B 2562/0266; A61B 2562/043; A61B 2562/164; A61B 2562/166; G01N 33/367; G01N 2223/615
  See application file for complete search history.

(56) References Cited

U.S. PATENT DOCUMENTS

| | | | |
|---|---|---|---|
| 7,149,376 B2* | 12/2006 | Uchida | G02B 6/43 385/47 |
| 8,276,462 B2 | 10/2012 | Tao et al. | |
| 8,805,144 B1 | 8/2014 | McAlpine et al. | |
| 9,157,815 B2 | 10/2015 | Kyung et al. | |
| 9,304,031 B1 | 4/2016 | Gupta | |
| 10,357,078 B2* | 7/2019 | Rice | A61B 5/6807 |
| 10,398,189 B2* | 9/2019 | Amos | A61B 5/0002 |
| 10,976,207 B2 | 4/2021 | Peele et al. | |
| 11,109,635 B2 | 9/2021 | Molyneux et al. | |
| 2013/0137943 A1 | 5/2013 | Pinto Rodrigues | |
| 2016/0161326 A1 | 6/2016 | Chang et al. | |
| 2017/0115171 A1 | 4/2017 | Huang et al. | |
| 2018/0188125 A1 | 7/2018 | Park et al. | |
| 2018/0297214 A1 | 10/2018 | Lessing et al. | |
| 2019/0069785 A1 | 3/2019 | McMaster et al. | |
| 2019/0387833 A1 | 12/2019 | Luh | |
| 2020/0158584 A1 | 5/2020 | Morgan et al. | |
| 2021/0055171 A1* | 2/2021 | Harnett | G02B 6/4415 |
| 2021/0379340 A1 | 12/2021 | Stoker et al. | |
| 2023/0256258 A1* | 8/2023 | Tapper | A43B 3/34 607/28 |

FOREIGN PATENT DOCUMENTS

| | | | | |
|---|---|---|---|---|
| EP | 3695792 A1 * | 8/2020 | ....... | A61B 17/06166 |
| WO | 2021222164 A1 | 11/2021 | | |
| WO | 2021256921 A1 | 12/2021 | | |

OTHER PUBLICATIONS

Dragulinescu et al., "Smart Socks and In-Shoe Systems: State-of-the-Art for Two Popular Technologies for Foot Motion Analysis, Sports and Medical Applications", Aug. 2, 2020, retrieved from https://www.mdpi.com/1424-8220/20/15/4316/htm, 41 pages.

Guo et al., "Soft and Stretchable Polymeric Optical Waveguide-Based Sensors for Wearable and Biomedical Applications", Aug. 30, 2019, retrieved from https://www.mdpi.com/1424-8220/19/17/3771, 19 pages.

* cited by examiner

STRETCHABLE FIBER OPTIC PRESSURE SENSORS AND USES THEREOF

CROSS-REFERENCE TO RELATED APPLICATIONS

This application claims the benefit of and priority to U.S. Provisional Patent Application No. 63/219,283, filed Jul. 7, 2021 and titled "Fiber Optic Pressure Sensors and Uses Thereof," the entire contents of which are hereby fully incorporated herein by reference.

TECHNICAL FIELD

This disclosure relates to stretchable fiber optic pressure sensors with pressure tracking functionality.

BACKGROUND

Daily plantar pressure tracking is important to subjects, human or otherwise, with gait abnormality or body balance issues. Conventional plantar pressure sensors are not affordable, are uncomfortable for everyday use, and may be unreliable. A typical plantar pressure sensor uses thin, conductive film layers to track changes in resistance or capacitance, which requires unbreathable printed circuit board structures throughout the sole and a moisture-free environment to guarantee reliability. Conventional plantar pressure sensors are expensive and therefore cost prohibitive for some patients that need to own the device for use in a daily basis.

One example conventional plantar pressure sensor has a slippery surface interface on the sensing insole due to the use of dielectric film, which limits the sensor's capability to simulate the actual interaction between the foot and the interface inside the shoe. The contact points between the dielectric film and the foot displace relative to each other, which can be a safety issue during intense movements. The dielectric film on the insole is stiff, such that the edge of the plastic sensing pad becomes flexed and creates abnormal peak pressures. The example conventional plantar pressure sensor has a bulky and heavy data collector unit that is required to be mounted around each ankle of a user. The user also wears a data transmitter around the waist to tether between the data collector unit and software on a remote computer. The example conventional plantar pressure sensor restricts natural movements of the wearer, such as foot rotation or a change in center of mass. The example conventional plantar pressure sensor uses resistive pressure sensing approaches, which are based on deformation of the soft conductive material, in particular conductive ink between two polymer films. Deforming the material for pressure sensing decreases repeatability and reliability.

A second example conventional plantar pressure sensor uses capacitive pressure sensing approaches, which tracks a change of capacitance between two separated sets of metal strips covered by polyethylene films. The change in capacitance results from the deformation of dielectric material between the two metal strips, and as such recovery speed is unsatisfactory and may not show repeatable results. The conventional capacitive pressure sensing depicts nonlinearity and is sensitive to vibration, temperature, and humidity.

Other conventional plantar pressure sensing methods, such as camera-based motion tracking or pressure sensing mats, are inappropriate for wearable and daily-basis use.

DETAILED DESCRIPTION

Overview

Figure 1:
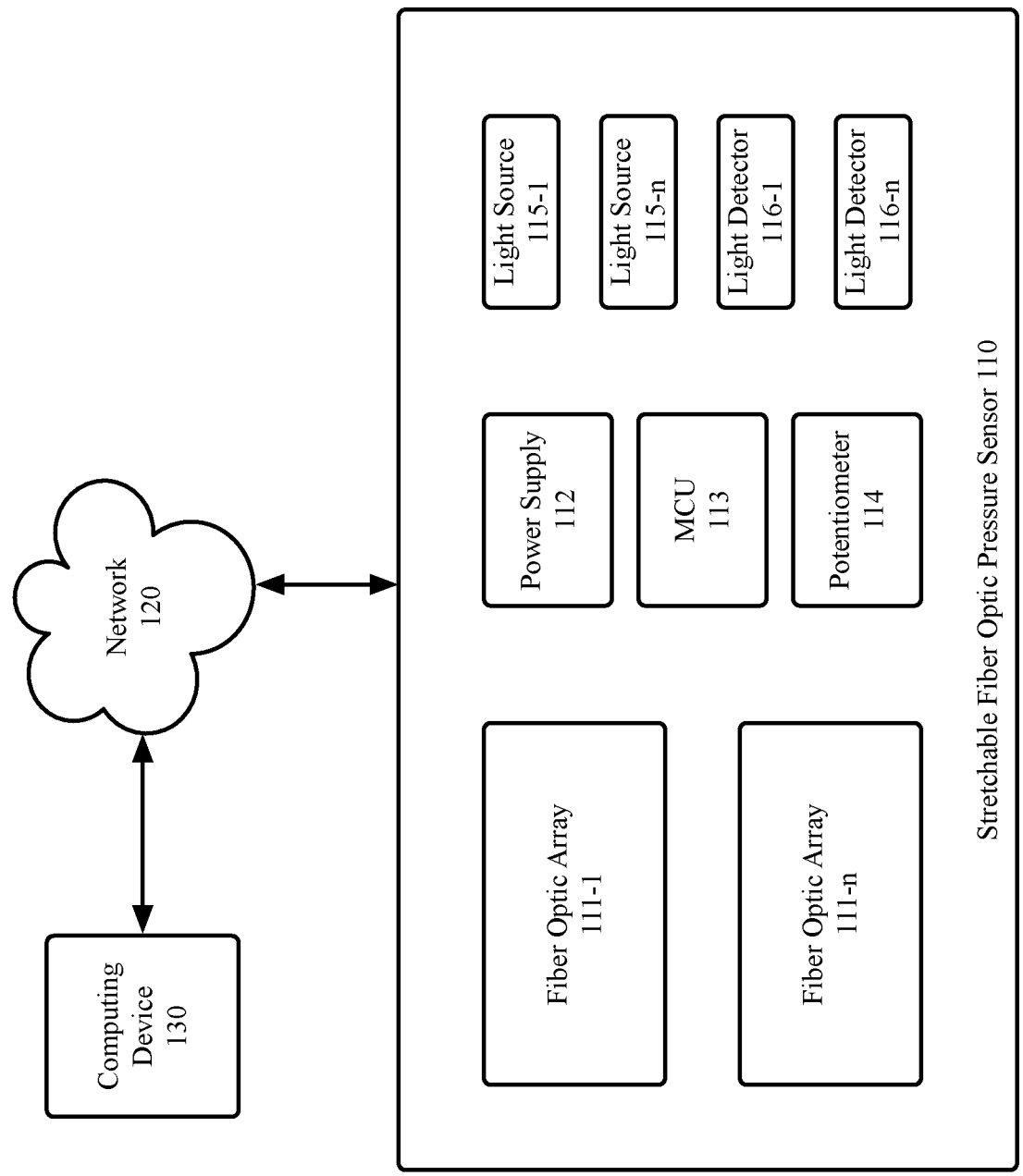
FIG. 1 is a block diagram depicting a stretchable fiber optic pressure sensor system.

The technology described herein is directed to stretchable fiber optic pressure sensors with pressure tracking functionality. Daily plantar pressure tracking is important to subjects, human or otherwise, with gait abnormality or body balance issues. Daily-basis pressure tracking may reduce symptoms in children when they receive proper treatments in the early stages of a disease or ailment. Daily-basis pressure tracking can also benefit healthy individuals who want to improve their gait posture and physical activity performance. Plantar pressure sensors may be used to diagnose or monitor health issues associated with a disease or condition such as arthritis, ataxia, cerebellum disorders, Parkinson's disease, multiple sclerosis, cerebral palsy, autism, inner ear disorders, vision disorders, and/or other health issues.

A stretchable fiber optic pressure sensor is a sensing device that uses stretchable optical fibers that deform as a result of an applied force. The stretchable fiber optic pressure sensor may be a plantar pressure sensor. A deformation of a fiber causes a change in the light being transmitted by the fiber when the fiber is proximate to the location of the applied force. The deformation causes a defect such as a compression, a bend, a crease, or a dent, that decreases or alters an intensity or duration of the transmitted light. The stretchable fiber optic pressure sensor may be used to determine a force or a pressure based on the deformation of the one or more fibers. The stretchable fiber optic sensor may be configured as a pressure sensing or force sensing garment including an insole of a shoe, a sock or other foot covering, a hand cover, a knee cover, an elbow cover, a film, or a mat.

The stretchable fiber optic sensor may be configured as a virtual reality device or an augmented reality device. The stretchable fiber optic sensor may be configured to be worn by a human, a non-human animal, or non-living user such as a robot.

The stretchable fiber optic pressure sensor may be configured to determine a pressure or force as applied by an appendage of a user, such as a hand, a foot, a paw, or a hoof. The stretchable fiber optic pressure sensor may be configured to determine a portion of the appendage causing the deformation of the stretchable optical fibers such as a hallux, a metatarsal head, a midfoot, or a condyle of a foot. Multiple stretchable fiber optic pressure sensors may be configured to be in contact simultaneously with multiple appendages of a user. For example, a user may have a stretchable fiber optic pressure sensor configured as an insole and inserted in both shoes. The stretchable fiber optic pressure sensors may determine a gait, a posture, a pace, toe-walking, limping, stumbling, foot drop, swaying, or shuffling of a user as the user walks. The stretchable fiber optic pressure sensor is configurable to transmit data associated with the applied pressure or force to a user's mobile device or computer to monitor attributes associated with the gait, posture, pace, etc. determined through the use of the sensor.

The stretchable fiber optic pressure sensor can be lightweight, breathable, chemically stable, thin, flexible, waterproof, durable, and immune to the electromagnetic spectrum that may affect other electronic devices.

These and other aspects, objects, features, and advantages of the disclosed technology will become apparent to those having ordinary skill in the art upon consideration of the following detailed description of illustrated examples.

Example System Architecture

Turning now to the drawings, in which like numerals indicate like (but not necessarily identical) elements throughout the figures, examples of the technology are described in detail.

FIG. 1 is a block diagram depicting a stretchable fiber optic pressure sensor system 100, in accordance with certain examples. As depicted in FIG. 1, stretchable fiber optic pressure sensor system 100 comprises a stretchable fiber optic pressure sensor 110 and a computing device 130. Stretchable fiber optic pressure sensor 110 and computing device 130 are configured to communicate via a network 120.

Stretchable fiber optic pressure sensor 110 is a sensing device that uses optical fibers 210 that deform as a result of an applied force. A deformation of one or more of optical fibers 210 causes a change in the light being transmitted by one or more optical fibers 210 proximate to the location of the applied force, the change varying based upon a location of the one or more optical fibers 210 relative to the location of the applied force. The deformation causes a defect in one or more of optical fibers 210, such as a compression, a bend, a crease, or a dent, that decreases an intensity of the transmitted light or alters a duration of the transmitted light. The deformation of the one or more optical fibers 210 may comprise a cross-section of the one or more optical fibers changing from a circular cross-section to an elliptical cross-section. Stretchable fiber optic pressure sensor 110 may be used to determine a force or a pressure based on deformation of optical fibers 210. Stretchable fiber optic pressure sensor 110 may be used to diagnose or monitor health issues associated with the status of a disease or condition such as, but not limited to, arthritis, ataxia, cerebellum disorders, Parkinson's disease, multiple sclerosis, cerebral palsy, autism, inner ear disorders, vision disorders, or any other suitable health issues or combination thereof. Stretchable fiber optic sensor 110 may be configured as a pressure sensing or force sensing garment including, but not limited to, an insole of a shoe, a sock or other foot covering, a hand cover, a knee cover, an elbow cover, a film, or a mat. Stretchable fiber optic sensor 110 may be configured as a virtual reality device or an augmented reality device. Stretchable fiber optic sensor 110 may be configured to be worn by a user, human or non-human. For example, stretchable fiber optic sensor 110 may be configured to be worn by a human, an agricultural mammal (e.g., cows, pigs, or goats), a pet, a service animal, any other suitable animal, or non-living user such as a robot. In further examples, the user may be referred to as a subject.

Stretchable fiber optic pressure sensor 110 may be configured to determine a pressure or force as applied by an appendage 320 of a subject, such as a hand, a foot, a paw, or a hoof. Stretchable fiber optic pressure sensor 110 may be configured to determine a portion of the appendage 320 causing the deformation of the optical fibers 210. In the example of a foot, stretchable fiber optic pressure sensor 110 may determine a pressure or force exerted by a hallux, a metatarsal head, a midfoot, a condyle, any other suitable portion of a subject's foot, or any combination thereof. One or more stretchable fiber optic pressure sensors 110 may be configured to be in contact with one or more appendages 320 of a subject. For example, a subject may have a stretchable fiber optic pressure sensor 110 configured as an insole and inserted in both shoes of the subject. In the present example, the stretchable fiber optic pressure sensors 110 may determine a gait, a posture, a pace, toe-walking, limping, stumbling, foot drop, swaying, shuffling, any other suitable walking feature, or any combination thereof. The present example may be applied to a paw or a hoof of a subject with stretchable fiber optic sensor 110 configured as a paw or a hoof covering for the subject.

The deformation of a fiber optic fiber 210 decreases the intensity of the light transmitted through the particular fiber. For example, a deformation or deformations may result in a decrease of light transmission of about 1% to about 99%, including all 0.1% values and ranges therebetween. The decrease in the intensity of the transmitted light can be correlated to a pressure value and used, in combination with outputs from additional optical fibers 210 via light detectors 116, to generate a two-dimensional pressure distribution map. Stretchable fiber optic pressure sensor 110 is lightweight, breathable, chemically stable, thin, flexible, waterproof, durable, and immune to the electromagnetic spectrum that may affect other electronic devices.

Stretchable fiber optic pressure sensor 110 comprises one or more fiber optic arrays 111, a power supply 112, a microcontroller unit ("MCU") 113, a potentiometer 114, one or more light sources 115, and one or more light detectors 116.

Stretchable fiber optic pressure sensor 110 comprises one or more fiber optic arrays 111. Fiber optic array 111 comprises one or more optical fibers 210, described in greater detail herein with reference to FIG. 2A. Fiber optic array 111 may comprise a combination of different types of fibers. In an example, fiber optic array 111 may comprise a combination of optical fibers, flexible optical fibers, and stretchable optical fibers.

Figure 2A:
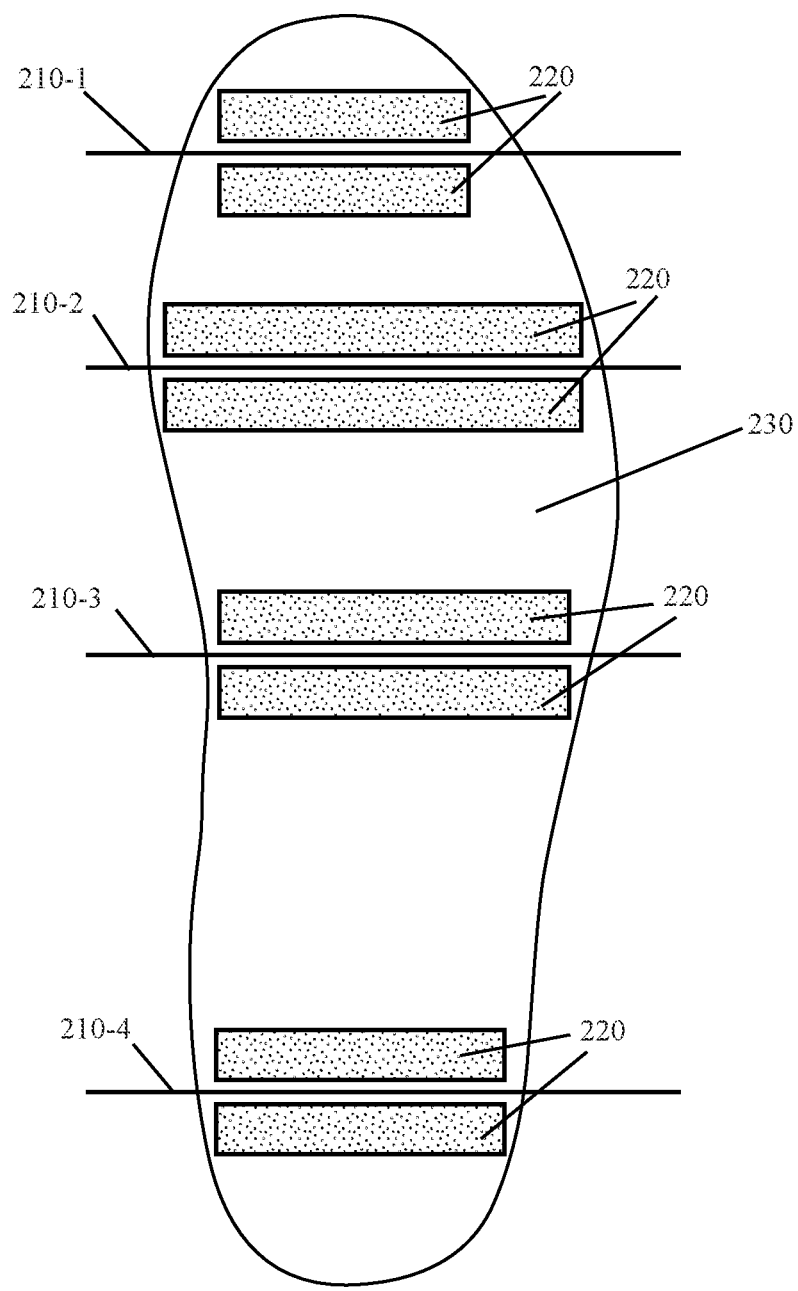
FIG. 2A is an example embodiment of a stretchable fiber optic pressure sensor with buffer structures with a horizontal fiber optic array.
Figure 2B:
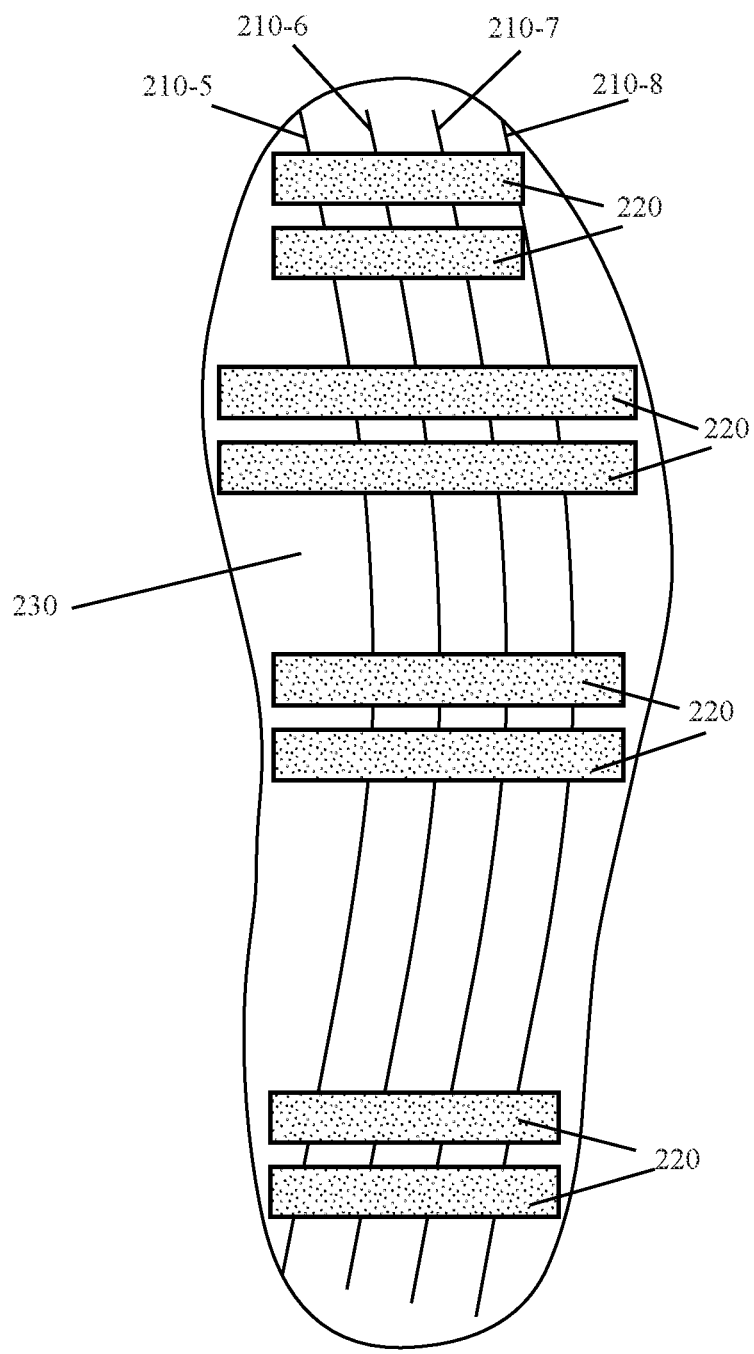
FIG. 2B is an example embodiment of a stretchable fiber optic pressure sensor with buffer structures with a vertical fiber optic array.
Figure 2C:
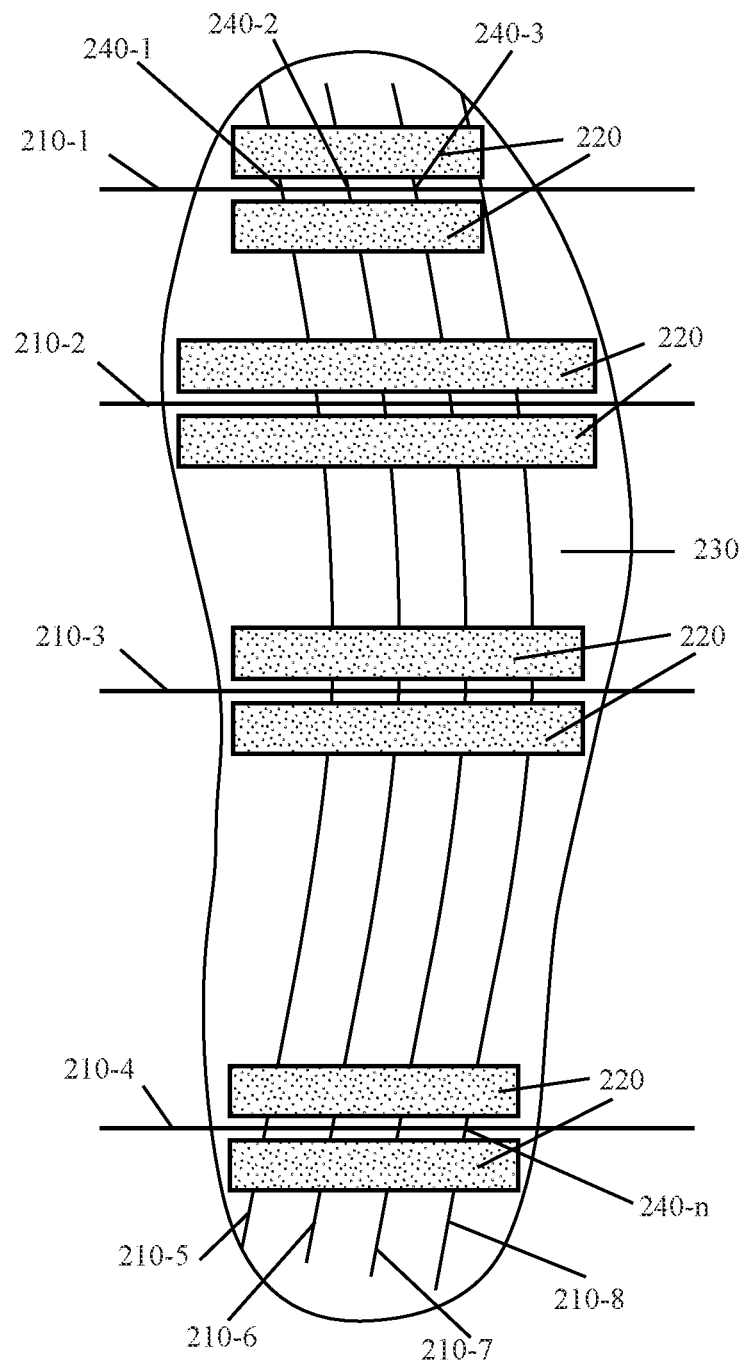
FIG. 2C is an example embodiment of a stretchable fiber optic pressure sensor with buffer structures with horizontal and vertical fiber optic arrays.

Fiber optic array 111 comprises one or more optical fibers 210 arranged to lie substantially in a single plane. Fiber optic array 111 comprises one or more optical fibers 210 arranged in a substantially parallel configuration. Example embodiments of fiber optic array 111 are depicted in FIGS. 2A-2C, described in greater detail herein.

Stretchable fiber optic pressure sensor 110 comprises power supply 112. In an example, power supply 112 comprises a battery, not depicted, that is connected to MCU 113 by flexible printed circuit board ("FPCB") 410. In an example, the battery is rechargeable. In an example, the battery is non-rechargeable, but replaceable. In an example, the battery comprises a slim form factor. In an example, the battery may be a lithium polymer ("LiPo") battery, a lithium ceramic battery, a triboelectric nanogenerator ("TENG"), or any other suitable slim form factor power supply for stretchable fiber optic pressure sensor 110. The battery is affixed to FPCB 410 such that the terminals of the battery are conductively connected to FPCB 410.

Stretchable fiber optic pressure sensor 110 comprises MCU 113. MCU 113 may be a general-purpose processor, a processor core, a reconfigurable processor, a printed circuit board ("PCB"), a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. MCU 113 may be powered by power supply 112.

In an example, MCU 113 is a pre-programmed MCU. In an example, MCU 113 has a small form factor and is affixed to FPCB 410 such that MCU 113 receives power from FPCB 410. In an example, MCU 113 may comprise Inter-Integrated Circuit ("I2C") interfaces, serial interfaces peripheral ("SPI"), or Universal Asynchronous Receiver/Transmitter ("UART") interfaces to interface with other devices. In an example, MCU 113 may be configured to communicate with external computing systems or other computing devices via wireless communication, such as by a radio frequency identification ("RFID") signal, for example, computing device 130. In an example, MCU 113 may be configured to communicate with external computing systems or other computing devices via BLUETOOTH®, for example, computing device 130.

In an example, MCU 113 is configured to control a light intensity of light sources 115 via potentiometer 114. MCU 113 is configured to receive an input from light detectors 116 associated with received light intensities or durations of received light signals or transmissions. In an example, MCU 113 is configured to receive the inputs (intensity or duration) and convert the inputs to voltage values. In an example, MCU 113 is configured to receive the inputs (intensity or duration) and convert the inputs to pressure values. MCU 113 may be configured to generate a two-dimensional mapping of voltage and/or pressure values. MCU 113 may transmit the two-dimensional mapping to an external computing device, such as computing device 130. In an example, MCU 113 may receive the inputs and transmit the inputs to an external computing device via wireless communication, such as computing device 130, so that the external computing device may convert the inputs to voltage and/or pressure values. Computing device 130 may be configured to generate a two-dimensional mapping of voltage and/or pressure values.

Stretchable fiber optic pressure sensor 110 comprises potentiometer 114. While FIG. 1 depicts a single potentiometer 114, stretchable fiber optic pressure sensor 110 may comprise one or more potentiometers 114. Potentiometer 114 is a variable resistance device that may be individually controlled to adjust a voltage input to light sources 115. In an example, an increase in voltage corresponds to an increase in light intensity transmitted by light sources 115. A decrease in voltage corresponds to a decrease in light intensity transmitted by light sources 115.

Stretchable fiber optic pressure sensor 110 comprises one or more light sources 115. In an example, light source 115 is an optical light and/or an infrared ("IR") light source. In an example, light source 115 may include light emitting diodes ("LED"), lasers, or any other suitable light source or combination of light sources. In an example, each light source 115 is connected to one or more optical fibers 210. Each light source 115 may be connected to a particular fiber optic fiber 210 by a connector. In an example, the connector is a cap or other suitable connecting device. In an example, the connector is a 3D-printed, rigid cylinder-shaped cap with two holes, a relatively small hole for the fiber optic fiber 210 and a larger hole for light source 115 or light detector 116. Various connector shapes/structures can be used depending on the shape and size of optical fibers 210, light sources 115, and light detectors 116.

Stretchable fiber optic pressure sensor 110 comprises one or more light detectors 116. In an example, light detector 116 is an optical light and/or IR light detector. In an example, light detector 116 may include photodiodes, photoconductors, or any other suitable light detector or combination of light detectors. In an example, each light detector 116 is connected to one or more optical fibers 210. Each light detector 116 may be connected to a particular fiber optic fiber 210 by a connector. In an example, the connector is a cap or other suitable connecting device. In an example, the connector is a 3D-printed, rigid cylinder-shaped cap with two holes, a relatively small hole for the fiber optic fiber 210 and a larger hole for light source 115 or light detector 116. Various connector shapes/structures can be used depending on the shape and size of optical fibers 210, light sources 115, and light detectors 116.

Stretchable fiber optic pressure sensor 110 and computing device 130 are configured to communicate via a network 120. In example embodiments, network 120 includes one or more wired or wireless telecommunications systems by which network devices may exchange data. For example, the network 120 may include one or more of a local area network ("LAN"), a wide area network ("WAN"), an intranet, an Internet, a storage area network ("SAN"), a personal area network ("PAN"), a metropolitan area network ("MAN"), a wireless local area network ("WLAN"), a virtual private network ("VPN"), a cellular or other mobile communication network, a BLUETOOTH® wireless technology connection, a near field communication ("NFC") connection, any combination thereof, and any other appropriate architecture or system that facilitates the communication of signals, data, and/or messages.

Figure 7:
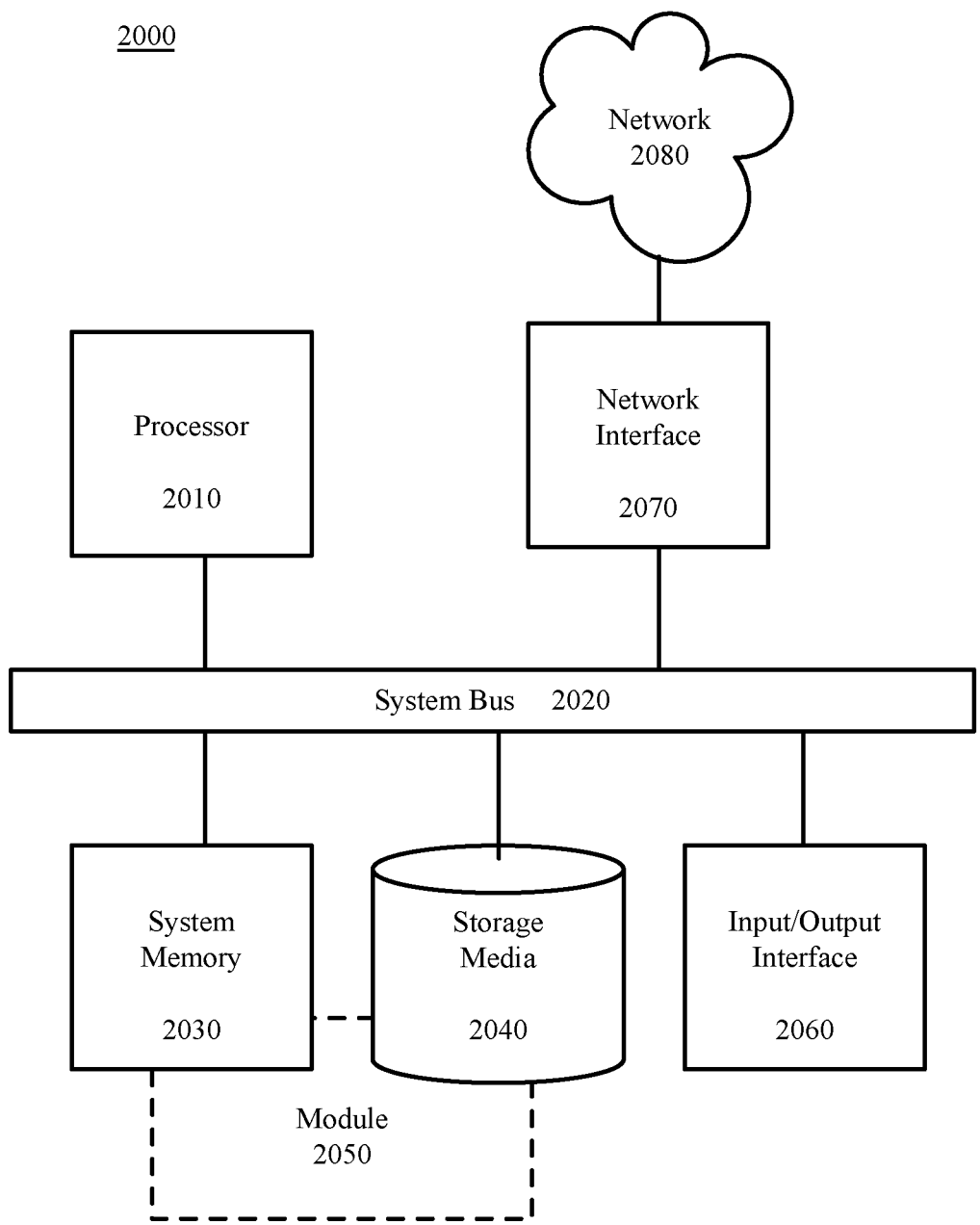
FIG. 7 is a block diagram depicting a computing machine and a module.

Computing device 130 may be any type of computing machine, such as, but not limited to, those discussed in more detail with respect to FIG. 7. For example, computing device 130 can include a server, desktop computer, laptop computer, tablet computer, a television with one or more processors embedded therein and/or coupled thereto, smart phone, handheld or wearable computer, personal digital assistant ("PDA"), other wearable device such as a smart watch or glasses, wireless system access point, or any suitable processor-driven device.

Computing device 130 may be configured to receive inputs from MCU 113 associated with pressure or force values from stretchable fiber optic sensor 110. MCU 113 may transmit data associated with pressure or force values periodically to computing device 130 such that computing device 130 may determine patterns associated with the data and may monitor or diagnosis potential health issues associated with a subject.

FIG. 2A is an example embodiment of a stretchable fiber optic pressure sensor 110 with buffer structures 220 with a horizontal fiber optic array 111-1, in accordance with certain examples. The example embodiment of FIG. 2A comprises optical fibers 210-1 through 210-4, buffer structures 220, and first layer 230. In an example, optical fiber 210 transmits (or is configured to transmit) one or more optical and/or infrared wavelength(s). In an example, optical fiber 210 transmits (or is configured to transmit) electromagnetic radiation having one or more wavelength(s) in the range of 400 nm to 50 microns (e.g., 600 nm to 10 microns), including all nm values and ranges therebetween. Optical fibers 210 may alternatively be referred to as fiber optic fibers or waveguides. In an example, optical fiber 210 is a flexible optical fiber. In an example, optical fiber 210 is a stretchable optical fiber. In the example of a stretchable optical fiber, optical fiber 210 may be comprised of one or more elastomer materials. The stretchable optical fiber may be configured to lose light to an environment as the fiber is deformed as a result of an applied force or pressure. In an example, more light (i.e., light intensity) is lost as the deformation is increased. In an example, optical fiber 210 may or may not comprise a cladding. Cladding is a material that surrounds optical fiber 210 with a lower refractive index to contain the light transmitted within the fiber. Non-limiting examples of stretchable optical fibers are found in International Publication Nos. WO2017147573 A1, WO2019108861 A1, and WO2019108862 A1, the disclosures of which with regard to optical fibers are incorporated herein by reference.

FIG. 2A depicts four optical fibers 210-1 through 210-4 arranged in a substantially horizontal, parallel configuration relative to first layer 230. The set of optical fibers 210-1 through 210-4 form a fiber optic array 111, referred to in this example as horizontal fiber optic array 111-1. While FIG. 2A depicts four optical fibers 210, any suitable quantity of optical fibers 210 may be used including 1, 2, 3, 5, 6, or more optical fibers 210. Optical fibers 210 may be equally spaced apart across first layer 230 or may be spaced in a one or more patterns across first layer 230. In an example, the spacing and/or patterns of optical fibers 210 may be configured to align with a particular portion of an appendage 320 to detect pressure or force applied to that particular portion of the appendage 320.

FIG. 2A depicts optical fibers 210 disposed between buffer structures 220. In an example, buffer structures 220 are optional. In an example, buffer structures 220 are configured to prevent total loss of light (such as, for example, optical light, IR light, or the like, or a combination thereof) due to a deformation of second layer 310 (described herein with reference to FIG. 3) and/or physical damage to optical fibers 210. In an example, buffer structures 220 are disposed between first layer 230 and second layer 310. In an example, buffer structures 220 are buffer blocks. In an example, buffer structures 220 are part of (e.g., integrated with) second layer 310. In an example, buffer structures 220 comprise (or are formed from) one or more second layer 310 material(s). In an example, buffer structures 220 are optional and may not be comprised in flexible fiber optic pressure sensor 110.

FIG. 2A depicts first layer 230. In an example, first layer 230 is rigid. In an example, first layer 230 is a base layer. In an example, first layer 230 provides support for a force or pressure second layer 310 that deforms one or more optical fibers 210. In an example, first layer 230 is formed from materials typically used for shoe midsole materials. In an example, the materials are relatively heavy, dense, rigid, and durable compared to insole materials. In an example, first layer 230 comprises (or is formed from) one or more polymeric materials. Non-limiting examples of polymeric materials include elastomers (such as, for example, ethylene-vinyl acetate ("EVA") copolymers, polyurethanes ("PU"), and the like, and combinations thereof), thermoplastic polyurethanes ("TPU"), rubbers, carbon, nylons, plastics, and the like, and combinations thereof. In an alternate example, first layer 230 comprises the same material as second layer 310. This example composition will be described in greater detail herein with reference to FIG. 3 and FIG. 5A.

FIG. 2B is an example embodiment of a stretchable fiber optic pressure sensor 110 with buffer structures 220 with a vertical fiber optic array 111-2, in accordance with certain examples. The example embodiment of FIG. 2B comprises optical fibers 210-5 through 210-8, buffer structures 220, and first layer 230. Optical fibers 210, buffer structures 220, and first layer 230 were previously described herein with reference to FIG. 2A. FIG. 2B depicts four optical fibers 210-5 through 210-8 arranged in a substantially vertical, parallel configuration relative to first layer 230. The set of optical fibers 210-5 through 210-8 form a fiber optic array 111, referred to in this example as vertical fiber optic array 111-2. While FIG. 2B depicts four optical fibers 210, any suitable quantity of optical fibers 210 may be used including 1, 2, 3, 5, 6, or more optical fibers 210. Optical fibers 210 may be equally spaced apart across first layer 230 or may be spaced in a one or more patterns across first layer 230. In an example, the spacing and/or patterns of optical fibers 210 may be configured to align with a particular portion of an appendage 320 to detect pressure or force applied to that particular portion of the appendage 320.

FIG. 2C is an example embodiment of a stretchable fiber optic pressure sensor 110 with buffer structures 220 with horizontal fiber optic array 111-1 and vertical fiber optic array 111-2, in accordance with certain examples. The example embodiment of FIG. 2C comprises optical fibers 210-1 through 210-4 (horizontal fiber optic array 111-1), optical fibers 210-5 through 210-8 (vertical fiber optic array 111-2), buffer structures 220, first layer 230, and deformable data points, or pressure data points, 240. Optical fibers 210, buffer structures 220, and first layer 230 were previously described herein with reference to FIG. 2A.

As depicted in FIG. 2C, horizontal fiber optic array 111-1 overlays (e.g., is in proximity to or is in contact with) vertical fiber optic array 111-2 such that optical fibers 210 of horizontal fiber optic array 111-1 are substantially perpendicular to the optical fibers 210 of vertical fiber optic array 111-2 and such that a plurality of deformable data points, or pressure data points, 240-1 through 240-n are created. In an example, a first fiber optic fiber 210-1 of horizontal fiber optic array 111-1 overlays (e.g., is in proximity to or is in contact with) a second fiber optic fiber 210-5 of vertical fiber optic array 111-2 forming deformation data point, or pressure data point, 240-1. In an example, an angle between (or an angle formed by) the longest axis fiber optic fiber 210-1 and the longest axis of fiber optic fiber 210-5 of is greater than zero and less than about 180 degrees, preferably about 80 to about 100 degrees, optimally about 90 degrees, including all 0.1 degree values and ranges therebetween.

In an example, the spacing and/or patterns of deformable data points, or pressure data points, 240 may be configured to align with a particular portion of an appendage 320 to detect pressure or force applied to the particular portion of the appendage 320. For example, deformable data points, or pressure data points, 240 may be arranged to correspond to a hallux, a metatarsal head, a midfoot, a condyle, or a combination thereof of a human foot. In an example, the spacing and/or patterns of deformable data points, or pressure data points, 240 may be configured via the configuration of optical fibers 210 of horizontal fiber optic array 111-1 and the configuration of optical fibers 210 of vertical fiber optic array 111-2.

In an example and as a result of a force or pressure being applied to stretchable fiber optic pressure sensor 110, a decrease in light transmission or signal may be detected at fiber optic fiber 210-2 (via the light detector 116 associated with fiber optic fiber 210-2) of horizontal fiber optic array 111-1 and a decrease in light transmission or signal may be detected at fiber optic fiber 210-6 (via the light detector 116 associated with fiber optic fiber 210-6) of vertical fiber optic array 111-2. MCU 113 receives data associated with the decreases in light transmission and maps the data to deformation data point 240-2. MCU 113 may generate a two-dimensional mapping of pressure or force values by receiving similar data from light detectors 116-1 through 116-n of stretchable fiber optic pressure sensor 110.

Figure 2D:
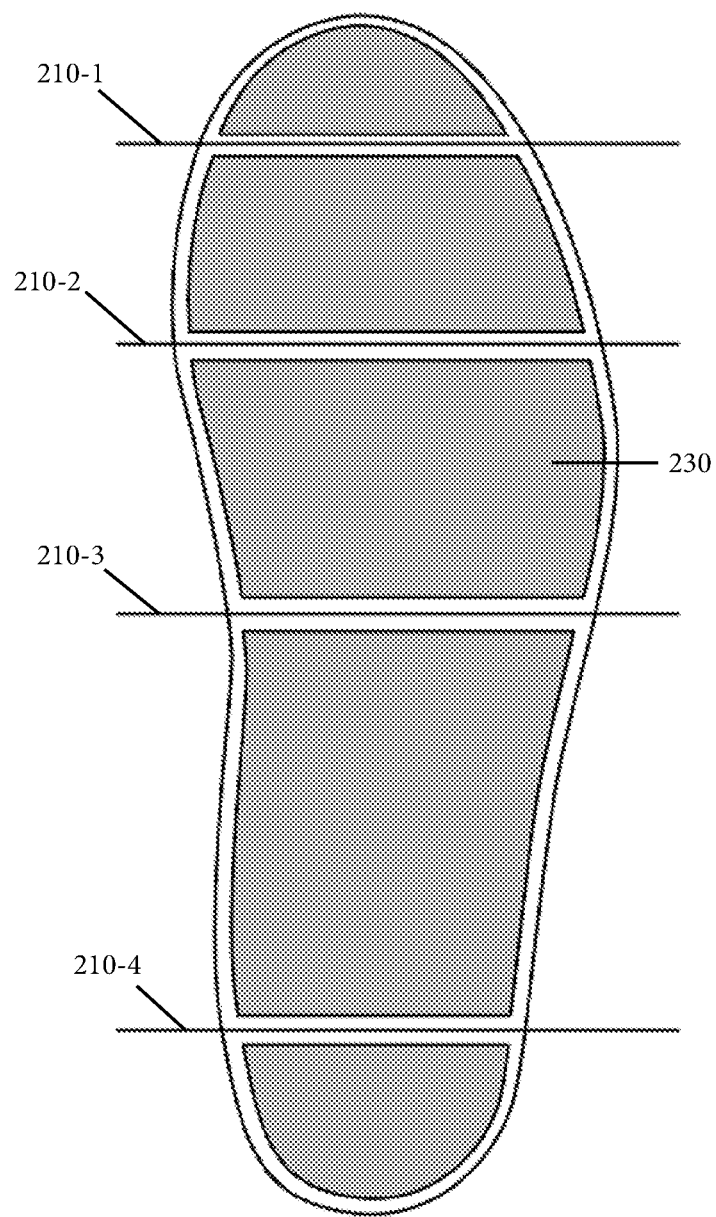
FIG. 2D is an example embodiment of a stretchable fiber optic pressure sensor with a horizontal fiber optic array.

FIG. 2D is an example embodiment of a stretchable fiber optic pressure sensor 110 with a horizontal fiber optic array 111-1, in accordance with certain examples. The example embodiment of FIG. 2A comprises optical fibers 210-1 through 210-4 and first layer 230. Optical fibers 210 and first layer 230 were previously described herein with reference to FIG. 2A.

FIG. 2D depicts four optical fibers 210-1 through 210-4 arranged in a substantially horizontal, parallel configuration relative to first layer 230. The set of optical fibers 210-1 through 210-4 form a fiber optic array 111, referred to in this example as horizontal fiber optic array 111-1. While FIG. 2D depicts four optical fibers 210, any suitable quantity of optical fibers 210 may be used including 1, 2, 3, 5, 6, or more optical fibers 210. Optical fibers 210 may be equally spaced apart across first layer 230 or may be spaced in a one or more patterns across first layer 230. In an example, the spacing and/or patterns of optical fibers 210 may be configured to align with a particular portion of an appendage 320 to detect pressure or force applied to that particular portion of the appendage 320.

Figure 2E:
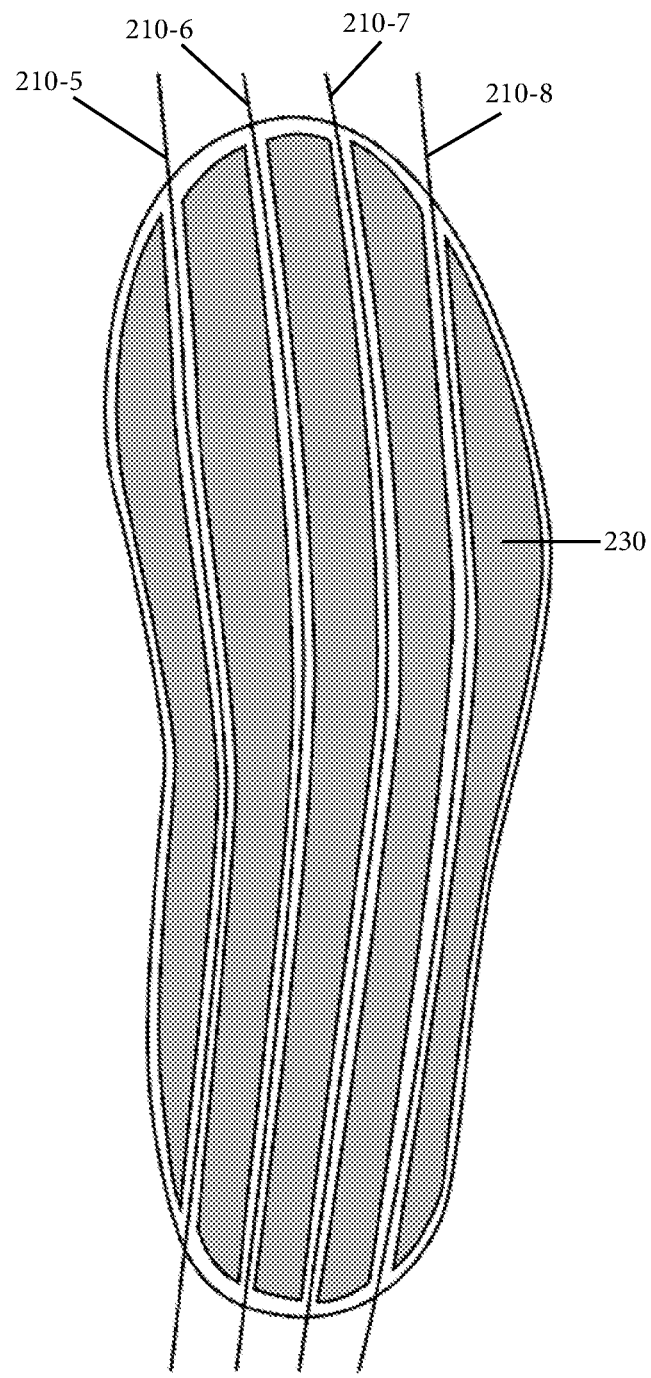
FIG. 2E is an example embodiment of a stretchable fiber optic pressure sensor with a vertical fiber optic array.

FIG. 2E is an example embodiment of a stretchable fiber optic pressure sensor 110 with a vertical fiber optic array 111-2, in accordance with certain examples. The example embodiment of FIG. 2B comprises optical fibers 210-5 through 210-8 and first layer 230. Optical fibers 210 and first layer 230 were previously described herein with reference to FIG. 2A. FIG. 2E depicts four optical fibers 210-5 through 210-8 arranged in a substantially vertical, parallel configuration relative to first layer 230. The set of optical fibers 210-5 through 210-8 form a fiber optic array 111, referred to in this example as vertical fiber optic array 111-2. While FIG. 2E depicts four optical fibers 210, any suitable quantity of optical fibers 210 may be used including 1, 2, 3, 5, 6, or more optical fibers 210. Optical fibers 210 may be equally spaced apart across first layer 230 or may be spaced in a one or more patterns across first layer 230. In an example, the spacing and/or patterns of optical fibers 210 may be configured to align with a particular portion of an appendage 320 to detect pressure or force applied to that particular portion of the appendage 320.

Figure 2F:
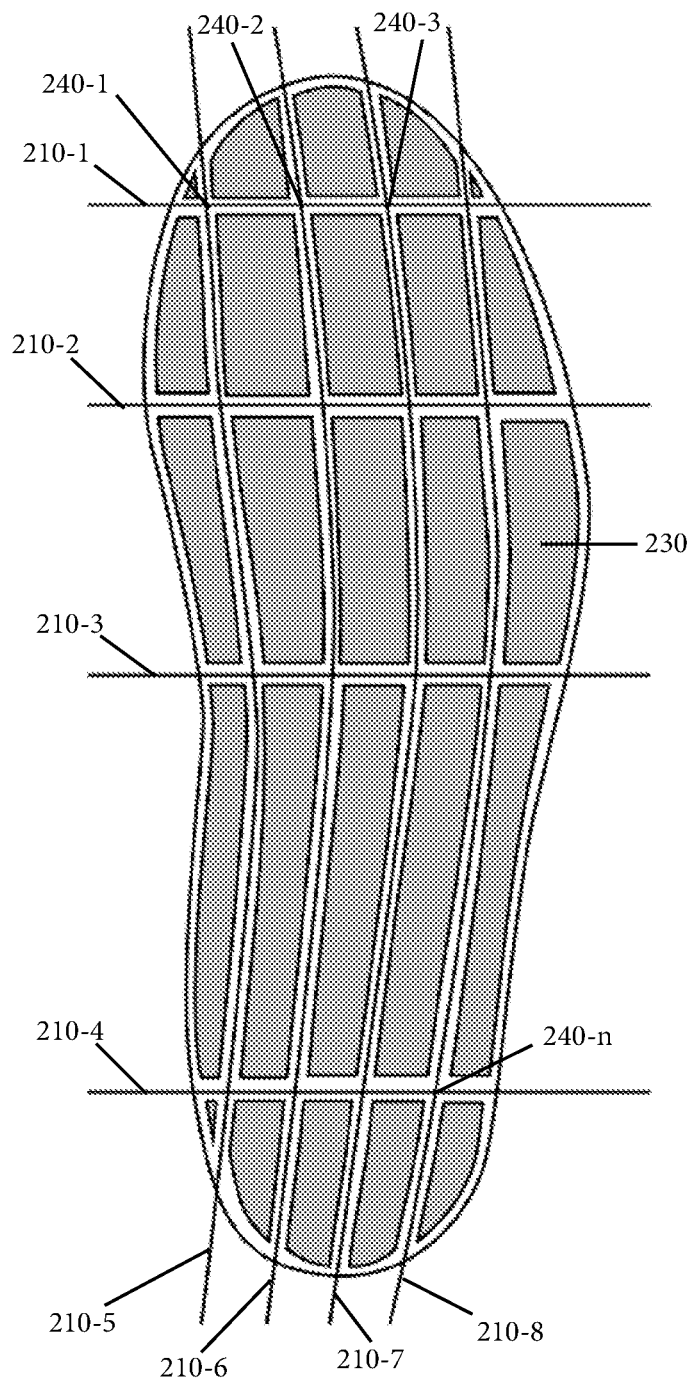
FIG. 2F is an example embodiment of a stretchable fiber optic pressure sensor with horizontal and vertical fiber optic arrays.

FIG. 2F is an example embodiment of a stretchable fiber optic pressure sensor 110 with horizontal fiber optic array 111-1 and vertical fiber optic array 111-2, in accordance with certain examples. The example embodiment of FIG. 2F comprises optical fibers 210-1 through 210-4 (horizontal fiber optic array 111-1), optical fibers 210-5 through 210-8 (vertical fiber optic array 111-2), first layer 230, and deformable data points, or pressure data points, 240. Optical fibers 210 and first layer 230 were previously described herein with reference to FIG. 2A.

As depicted in FIG. 2F, horizontal fiber optic array 111-1 overlays (e.g., is in proximity to or is in contact with) vertical fiber optic array 111-2 such that optical fibers 210 of horizontal fiber optic array 111-1 are substantially perpendicular to the optical fibers 210 of vertical fiber optic array 111-2 and such that a plurality of deformable data points, or pressure data points, 240-1 through 240-n are created. In an example, a first fiber optic fiber 210-1 of horizontal fiber optic array 111-1 overlays (e.g., is in proximity to or is in contact with) a second fiber optic fiber 210-5 of vertical fiber optic array 111-2 forming deformation data point, or pressure data point, 240-1. In an example, an angle between (or an angle formed by) the longest axis fiber optic fiber 210-1 and the longest axis of fiber optic fiber 210-5 is greater than zero and less than about 180 degrees, preferably about 80 to about 100 degrees, optimally about 90 degrees, including all 0.1 degree values and ranges therebetween.

In an example, the spacing and/or patterns of deformable data points, or pressure data points, 240 may be configured to align with a particular portion of an appendage 320 to detect pressure or force applied to the particular portion of the appendage 320. For example, deformable data points, or pressure data points, 240 may be arranged to correspond to a hallux, a metatarsal head, a midfoot, a condyle, or a combination thereof of a human foot. In an example, the spacing and/or patterns of deformable data points, or pressure data points, 240 may be configured via the configuration of optical fibers 210 of horizontal fiber optic array 111-1 and the configuration of optical fibers 210 of vertical fiber optic array 111-2.

In an example and as a result of a force or pressure being applied to stretchable fiber optic pressure sensor 110, a decrease in light transmission or signal may be detected at fiber optic fiber 210-2 (via the light detector 116 associated with fiber optic fiber 210-2) of horizontal fiber optic array 111-1 and a decrease in light transmission or signal may be detected at fiber optic fiber 210-6 (via the light detector 116 associated with fiber optic fiber 210-6) of vertical fiber optic array 111-2. MCU 113 receives data associated with the decreases in light transmission and maps the data to deformation data point 240-2. MCU 113 may generate a two-dimensional mapping of pressure or force values by receiving similar data from light detectors 116-1 through 116-n of stretchable fiber optic pressure sensor 110.

Figure 3A:
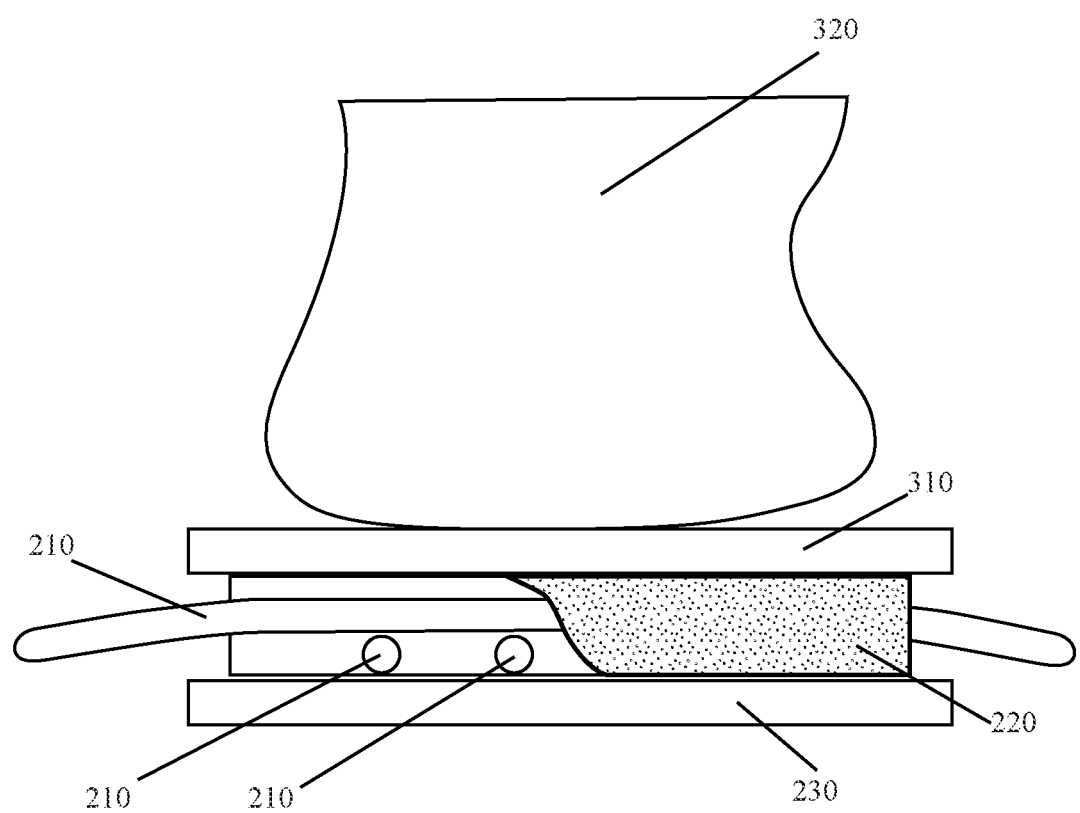
FIG. 3A is an example embodiment of a subject's appendage in contact with a stretchable fiber optic pressure sensor and FIG. 3B is an example embodiment of a subject's appendage applying a force to a stretchable fiber optic pressure sensor.

FIG. 3A is an example embodiment of a subject's appendage 320 in contact with a stretchable fiber optic pressure sensor 110, in accordance with certain examples. FIG. 3A depicts optical fibers 210, buffer structure 220, first layer 230, second layer 310, and appendage 320. Optical fibers 210, buffer structure 220, and first layer 230 were previously described herein with reference to FIG. 2A.

In an example, second layer 310 comprises deformable material. In an example, second layer 310 is molded or construction to guide optical fibers 210 and/or to control a pressure applied to stretchable fiber optic pressure sensor 110. In an example, second layer 310 moderates a deformation such that the deformation results in a detectible (e.g., measurable) change in light transmission of one or more optical fibers 210. In an example, second layer 310 is comfortable for a subject to wear. In an example, second layer 310 is a cover layer or an insole layer to be inserted into a shoe or other foot covering apparatus. In an example, second layer 310 is formed from materials typically used for shoe insole materials that are softer and/or more flexible than those used for first layer 230. In an example, second layer 310 comprises (or is formed from) one or more polymeric materials. Non-limiting examples of second layer 310 materials include elastomers (such as ethylene-vinyl acetate ("EVA") copolymers), polyethylenes, polyesters, polyvinyl chlorides, nylons, spandexes, wools, neoprene sponges, latexes, leathers, natural fibers (such as cotton), corks, gels, and combinations thereof. Sensor device platform 510 (described in greater detail herein with reference to FIG. 5A) comprises the combination of first layer 230, optical fibers 210 (one or more fiber optic fiber arrays 111), buffer structure 220 (optional), and second layer 310 as depicted in FIG. 3A.

In an alternate example, first layer 230 and second layer 310 comprise the same material. In the present example, first layer 230 and second layer 310 comprise a silicone based, flexible material that is 3D molded such that one or more fiber optic arrays 111 are disposed between a quantity of material forming first layer 230 and a quantity of material forming second layer 310 to form sensor device platform 510. Sensor device platform 510 will be described in greater detail herein with reference to FIG. 5A. In an example, 3D molding may comprise injection molding, 3D printing, casting, or any other suitable method to create a 3D sensor device platform 510. In an example, 3D molding a sensor device platform 510 enables a customized stretchable fiber optic pressure sensor 110 to conform to a particular subject (i.e., subject's appendage 320).

FIG. 3A depicts a subject's appendage 320 in contact with second layer 310 of stretchable fiber optic pressure sensor 110. Example appendages 320 include, but are not limited to, human appendages such as a hand or a foot. In an example, appendage 320 applies a force or pressure to one or more portions of second layer 310 such that one or more optical fibers 210 are deformed. Deformation of one or more optical fibers 210 decreases the intensity of the light transmitted through the each of the one or more optical fibers 210. For example, a deformation or deformations may result in a decrease of light transmission of about 1% to about 99%, including all 0.1% values and ranges therebetween. The decrease in the intensity of the transmitted light can be correlated to a pressure value and used, in combination with outputs from additional optical fibers 210 via light detectors 116, to generate a two-dimensional pressure distribution map.

Figure 3B:
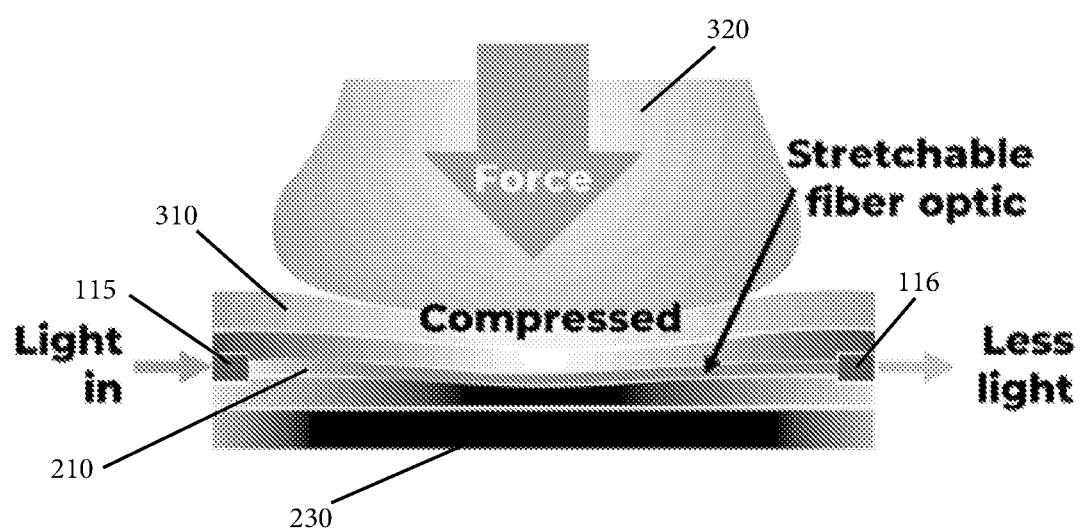

FIG. 3B is an example embodiment of a subject's appendage 320 applying a force to a stretchable fiber optic pressure sensor 110, in accordance with certain examples. FIG. 3B depicts a light source 115, a light detector 116, an optical fiber 210, a first layer 230, a second layer 310, and an appendage 320. Light source 115 and light detector 116 were previously described herein with reference to FIG. 1. Optical fiber 210 and first layer 230 were previously described herein with reference to FIG. 2A. Second layer 310 and appendage 320 were previously described herein with reference to FIG. 3A.

As an appendage 320 applies a force or a pressure to a stretchable fiber optic pressure sensor 110, second layer 310 is compressed or deformed, as depicted in FIG. 3B. The force or pressure may be due to a subject applying weight to an appendage 320, such as a force applied by a subject's foot when standing. The force or pressure may be due to a subject in motion, such as walking. As second layer 310 is compressed, optical fiber 210 is compressed or deformed, as depicted in FIG. 3B. When optical fiber 210 is compressed, the light transmitted through optical fiber 210 is decreased, i.e., the light intensity entering optical fiber 210 via light source 115 is greater than the light intensity detected at light detector 116. Light detector 116 transmits data associated with the received light intensity to MCU 113. MCU 113 receives the data associated with the decrease in light transmission and correlates the data to pressure or force values.

Figure 4:
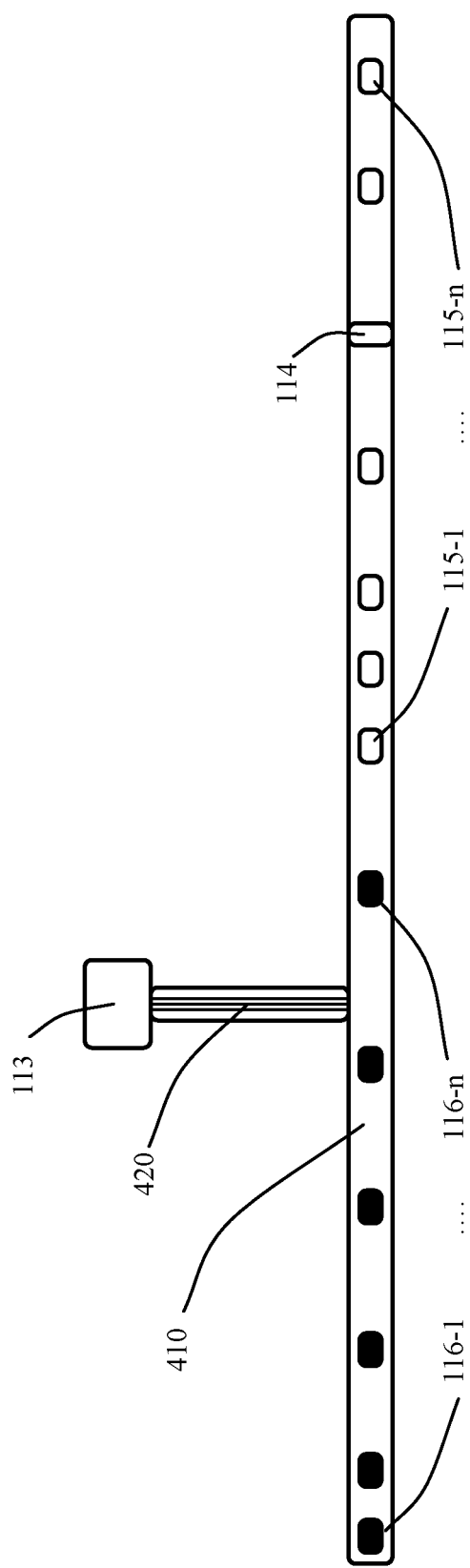
FIG. 4 is a block diagram depicting a flexible printed circuit board system.

FIG. 4 is a block diagram depicting a flexible printed circuit board system 400, in accordance with certain examples. Flexible printed circuit board ("FPCB") system 400 comprises power supply 112 (not depicted), MCU 113, potentiometer 114, one or more light sources 115, one or more light detectors 116, one or more optical fibers 210 (not depicted), flexible conductor 420, and FPCB 410. MCU 113, potentiometer 114, light sources 115, and light detectors 116 were previously described herein with reference to FIG. 1. Optical fibers 210 were previously described herein with reference to FIG. 2A. Power supply 112 (not depicted), MCU 113, potentiometer 114, one or more light sources 115, one or more light detectors 116 are conductively connected to FPCB 410 such that MCU 113, potentiometer 114, light sources 115, and light detectors 116 may receive power (i.e., voltage) from power supply 112 via FPCB 410. In addition, MCU 113 may transmit and receive signals to/from potentiometer 114, light sources 115, and light detectors 116.

In an example, MCU 113 may be affixed directly to FPCB 410. Alternately, and as depicted in FIG. 4, MCU 113 may be affixed to FPCB 410 by a flexible conductor 420. Flexible conductor 420 allows MCU 113 to be located in a substantially different location than sensor device platform 510. For example, sensor device platform 510 may be configured as a shoe insole. MCU 113 may be located external to a shoe, such as shoe 610, and affixed to a user's sock. Locating MCU 113 in a different location than sensor device platform 510 may increase the BLUETOOTH® range of MCU 113 and increase a comfort associated with a subject wearing stretchable optic pressure sensor 110.

FPCB 410, which also may be referred to as a flex print or a flex circuit, is a circuit board that can be bent into a desired shape. For example, FPCB 410 may bend to conform to a surface of sensor device platform 510. In an example where stretchable fiber optic sensor 110 is configured as an insole, FPCB 410 may conform to an outer edge or perimeter of sensor device platform 510 that is configured as an insertable shoe insole. As depicted in FIG. 4, FPCB 410 is substantially rectangular in shape but is bendable to conform to a perimeter of sensor device platform 510. In an example, FPCB 410 may bend in response to a motion of a subject, such as a movement of a foot. FPCB 410 may be a single sided circuit board, a single sided circuit board with dual access, a double-sided circuit board, a multi-layer circuit board, or any other suitable type of circuit board. The width and length range of FPCB 410 may be a width less than the thickness of sensor device platform 510 with a length suitable to encompass a perimeter of sensor device platform 510. The thickness range of FPCB 410, excluding affixed components, may be 0.1 mm to 2 mm, with a preferred thickness range of 0.1 mm to 1 mm, with an optimal thickness range of 0.1 mm to 0.5 mm.

When bent to conform to the perimeter of sensor device platform 510, a particular light source 115, such as light source 115-1, connected to a particular fiber optic fiber 210, such as fiber optic fiber 210-1 (not depicted), connected to a particular light detector 116, such as light detector 116-1, will lie in either a substantially horizontal position relative to sensor device platform 510 or a substantially vertical position relative to sensor device platform 510.

Figure 5A:
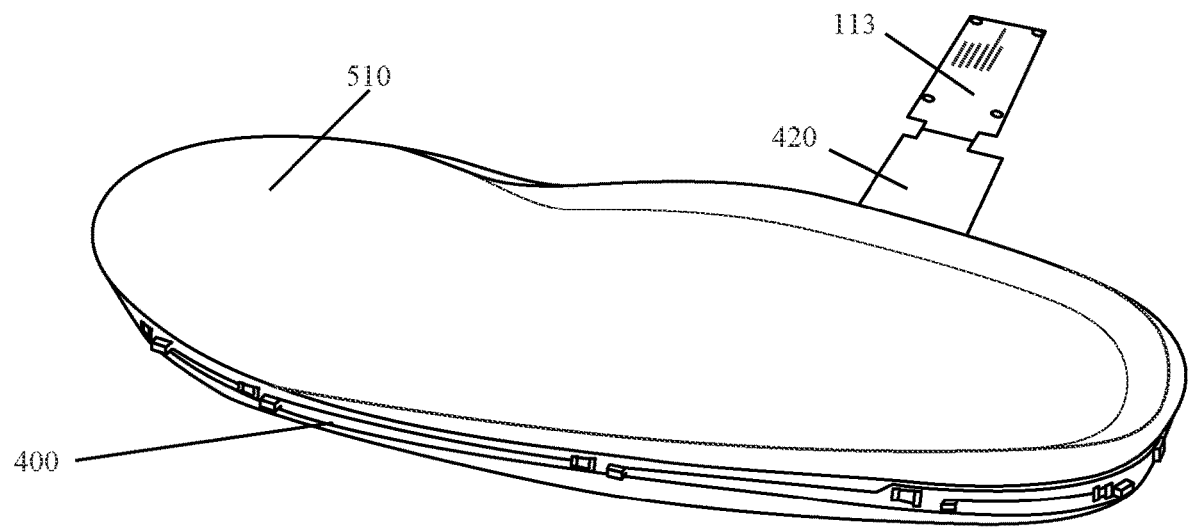
FIG. 5A depicts an example embodiment of a stretchable fiber optic pressure sensor system.

FIG. 5A depicts an example embodiment of a stretchable fiber optic pressure sensor system 100, in accordance with certain examples. FIG. 5A depicts MCU 113, FPCB system 400, flexible conductor 420, and sensor device platform 510. MCU 113 was previously described herein with reference to FIG. 1, and FPCB system 400 and flexible conductor 420 were previously described herein with reference to FIG. 4. In an example, sensor device platform 510 is configured to be a size and shape suitable to interface with a subject's appendage 320. In the example embodiment of FIG. 5A, sensor device platform 510 is depicted as an insole suitable to be inserted into a subject's shoe, such as shoe 610.

In reference to FIG. 3A, sensor device platform 510 may comprise first layer 230 and second layer 310, with one or more fiber optic fiber arrays 111 disposed between first layer 230 and second layer 310. In a first example, first layer 230, comprising a rigid material, and second layer 310, comprising a flexible material, are bonded together with an adhesive substance, with one or more fiber optic fiber arrays 111 disposed between first layer 230 and second layer 310. In a second example, sensor device platform 510 is 3D molded such that one or more fiber optic fiber arrays 111 are disposed between first layer 230 and second layer 310.

Figure 5B:
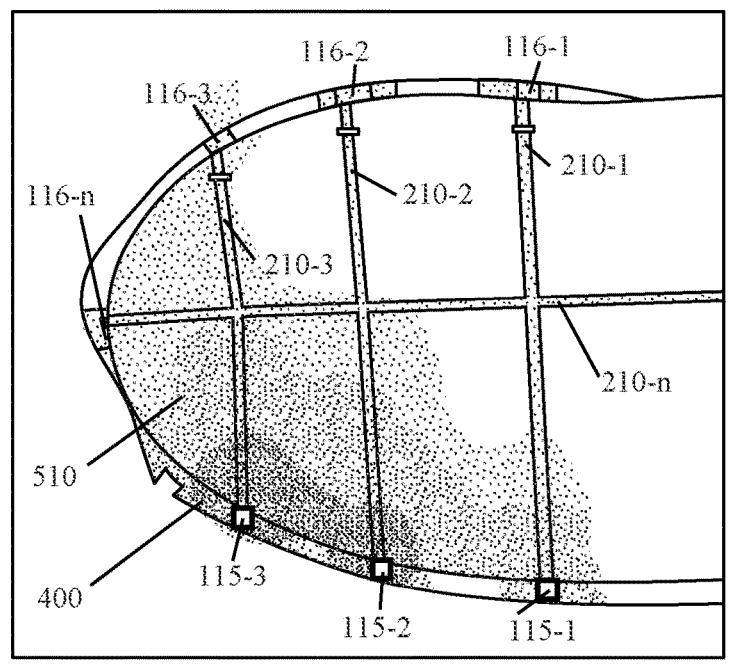
FIG. 5B depicts an enlargement of a portion of a stretchable fiber optic pressure sensor system.

FIG. 5B depicts an enlargement of a portion of a stretchable fiber optic pressure sensor system 100, in accordance with certain examples. FIG. 5B depicts light sources 115, light detectors 116, optical fibers 210, FPCB system 400, and sensor device platform 510. FIG. 5B depicts light sources 115 connected to optical fibers 210, in turn connected to light detectors 116. For example, and as depicted in FIG. 5B, light source 115-1 is connected to fiber optic fiber 210-1, which is further connected to light source 116-1 in a substantially horizontal position relative to sensor device platform 510.

Figure 5C:
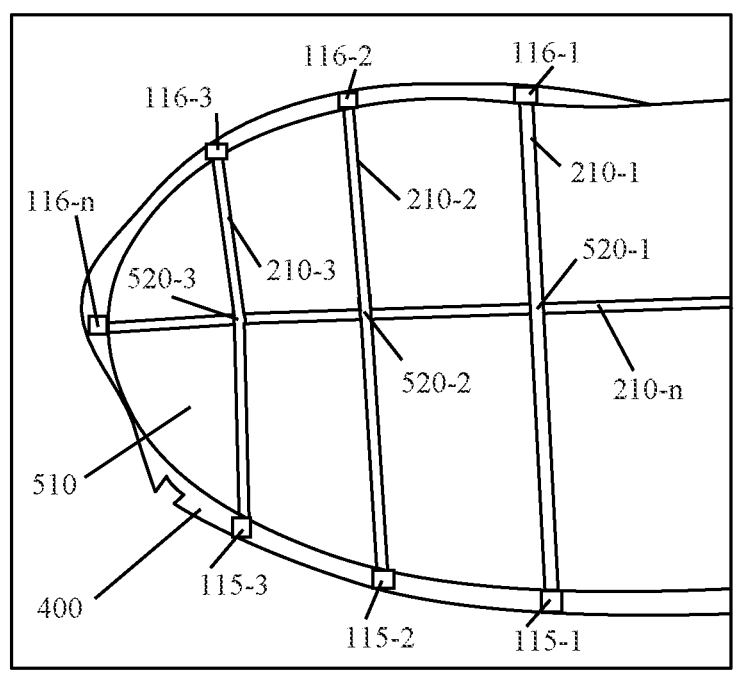
FIG. 5C depicts an enlargement of a portion of a stretchable fiber optic pressure sensor system further illustrating the overlay configuration of optical fibers.

FIG. 5C depicts an enlargement of a portion of a stretchable fiber optic pressure sensor system 100 further illustrating the overlay configuration of optical fibers 210, in accordance with certain examples. FIG. 5C depicts light sources 115, light detectors 116, optical fibers 210, FPCB system 400, sensor device platform 510, and overlay configuration 520. FIG. 5C depicts light sources 115 connected to optical fibers 210, in turn connected to light detectors 116. For example, and as depicted in FIG. 5C, light source 115-1 is connected to fiber optic fiber 210-1, which is further connected to light source 116-1 in a substantially horizontal position relative to sensor device platform 510.

FIG. 5C depicts an overlay configuration of optic fibers 210-1, 210-2, 210-3, and 210-*n* at 520-1, 520-2, and 520-3. At 520-1, optical fiber 210-1 is configured in an overlay configuration relative to optical fiber 210-*n*. At 520-2, optical fiber 210-2 is configured in an overlay configuration relative to optical fiber 210-*n*. At 520-3, optical fiber 210-3 is configured in an overlay configuration relative to optical fiber 210-*n*. While the horizontally disposed optical fibers 210-1 through 210-3 are depicted in an overlay configuration relative to the vertically disposed optical fiber 210-*n*, the arrangement may be transposed such that vertically disposed optical fibers 210 are in an overlay configuration relative to horizontally disposed optical fibers 210.

Figure 6A:
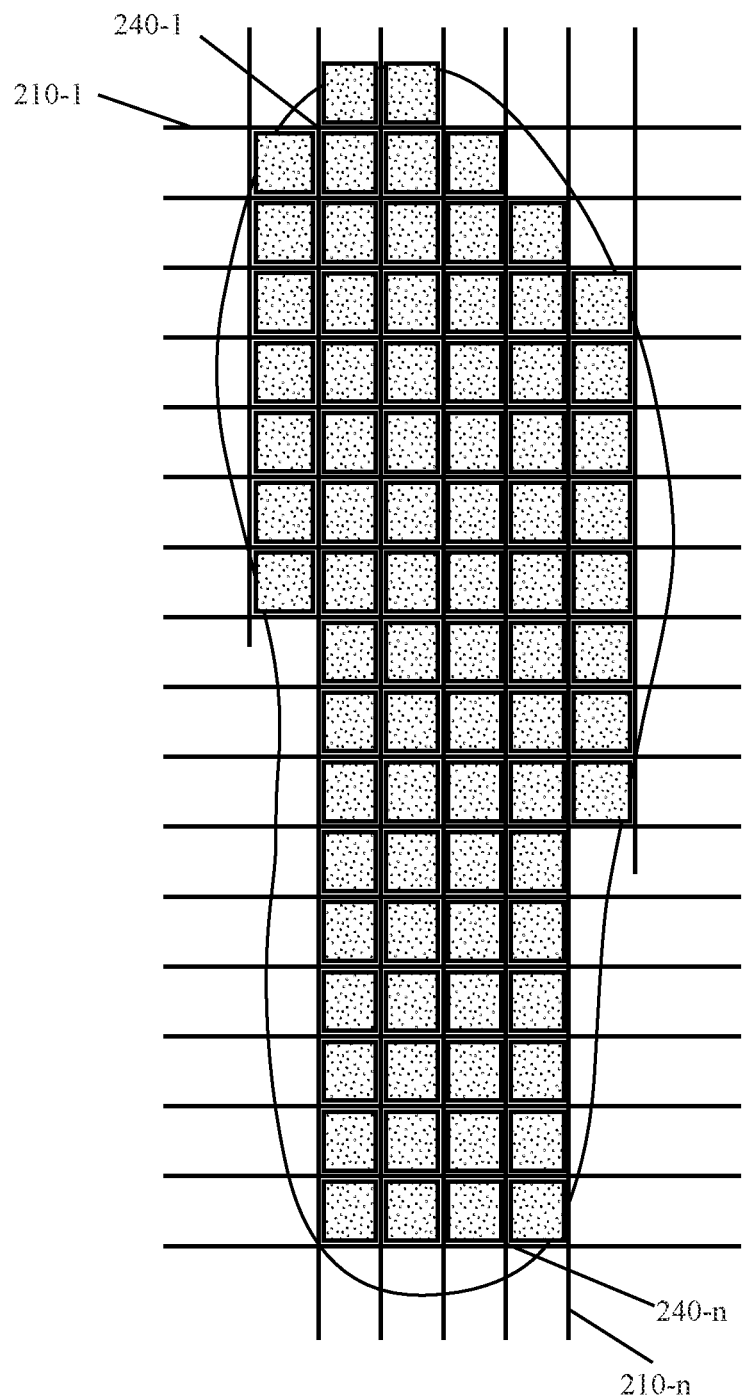
FIG. 6A depicts an example embodiment of a stretchable fiber optic pressure sensor with a plurality of deformable data points.

FIG. 6A depicts an example embodiment of a stretchable fiber optic pressure sensor 110 with a plurality of deformable data points, or pressure data points, 240, in accordance with certain examples. FIG. 6A depicts a plurality of horizontally and vertically disposed optical fibers 210 and a plurality of deformable data points, or pressure data points, 240. While depicted in a uniform pattern in FIG. 6A, deformable data points, or pressure data points, 240 may be unevenly spaced or spaced in a particular pattern. As previously described herein with reference to FIG. 2C, the quantity and the spacing and/or patterns of deformable data points, or pressure data points, 240 may be configured to align with a particular portion of an appendage 320 to detect pressure or force applied to the particular portion of the appendage 320. For example, deformable data points, or pressure data points, 240 may be arranged to correspond to a hallux, a metatarsal head, a midfoot, a condyle, or a combination thereof of a human foot. In an example, the quantity and the spacing and/or patterns of deformable data points, or pressure data points, 240 may be configured via the configuration of optical fibers 210 of horizontal fiber optic array 111-1 and the configuration of optical fibers 210 of vertical fiber optic array 111-2.

Figure 6B:
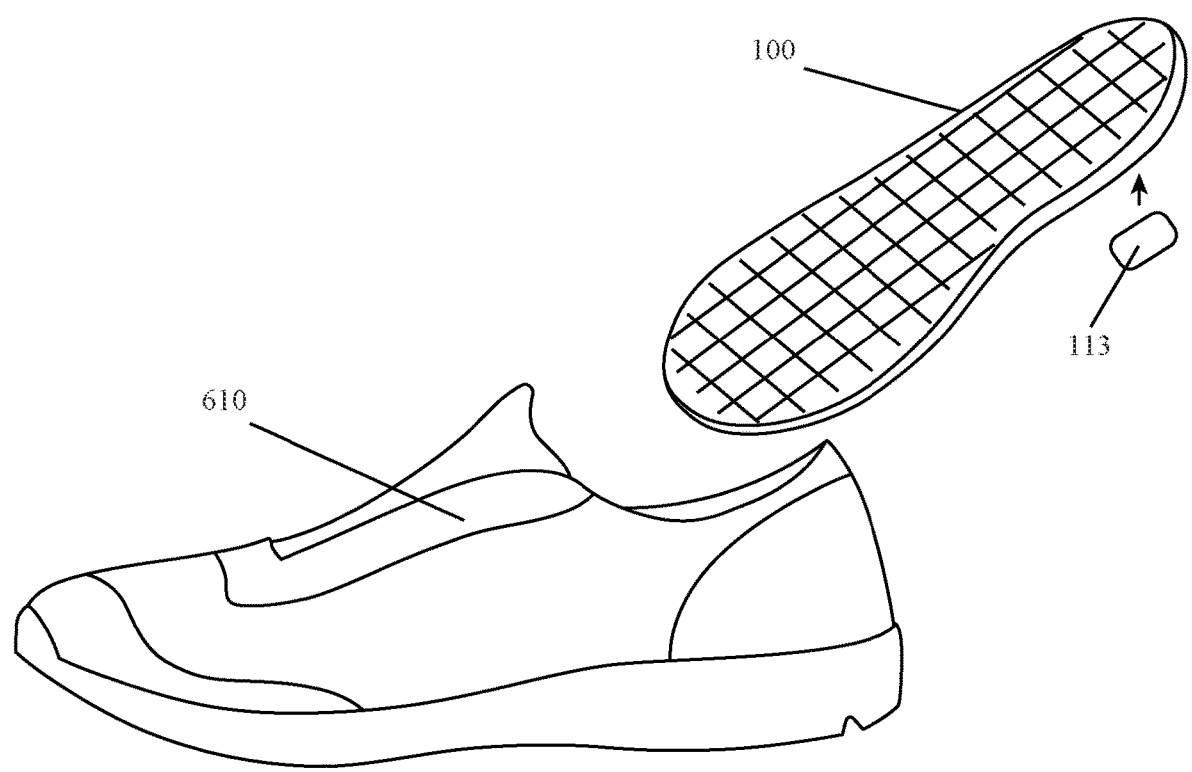
FIG. 6B depicts an example use case of a stretchable fiber optic pressure sensor system.

FIG. 6B depicts an example use case of a stretchable fiber optic pressure sensor system 100, in accordance with certain examples. As depicted in FIG. 6B, a stretchable fiber optic pressure sensor system 100 is shown as being inserted into a shoe 610.

Other Examples

FIG. 7 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2600. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 0630 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include WANs, LANs, intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

Various embodiments are described herein. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment," "an embodiment," "an example embodiment," or other similar language means that a particular feature, structure, or characteristic described in connection with the embodiment is included in at least one embodiment of the invention described herein. Thus, appearances of the phrases "in one embodiment," "in an embodiment," "an example embodiment," or other similar language in various places throughout this specification are not necessarily all referring to the same embodiment. Furthermore, the particular features, structures, or characteristics may be combined in any suitable manner in one or more embodiments, as would be apparent to a person having ordinary skill in the art and the benefit of this disclosure. Furthermore, while some embodiments described herein include some, but not other, features included in other embodiments, combinations of features of different embodiments are meant to be within the scope of the invention. For example, in the appended claims, any of the claimed embodiments can be used in any combination.

Although claimed subject matter will be described in terms of certain examples, other examples, including examples that do not provide all of the benefits and features set forth herein, are also within the scope of this disclosure. Various structural, logical, and process step changes may be made without departing from the scope of the disclosure.

The citation and/or incorporation by reference of any publication is for its disclosure prior to the filing date and should not be construed as an admission that the present disclosure is not entitled to antedate such publication by virtue of prior disclosure.

As used herein, "about," "approximately," "substantially," and the like, when used in connection with a measurable variable such as a parameter, an amount, a temporal duration, and the like, are meant to encompass variations of and from the specified value including those within experimental error, which can be determined by a given data set, art accepted standard, and/or with a given confidence interval (e.g., 90%, 95%, or more confidence interval from the mean), such as, for example, variations of +/−10% or less, +/−5% or less, +/−1% or less, and +/−0.1% or less of and from the specified value, insofar such variations are appropriate to perform in the disclosed disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error, and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Ranges of values are disclosed herein. The ranges set out a lower limit value and an upper limit value. Unless otherwise stated, the ranges include the lower limit value, the upper limit value, and all values between the lower limit value and the upper limit value, including, but not limited to, all values to the magnitude of the smallest value (either the lower limit value or the upper limit value) of a range. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also, unless otherwise stated, include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further disclosure. For example, if the value "about 10" is disclosed, then "10" is also disclosed.

Example 1 is a sensing device, comprising: a first layer; a second layer; a sensor device platform comprising a plurality of stretchable optical fibers disposed between the first layer and the second layer; one or more light sources, each of the stretchable optical fibers being connected to at least one of the light sources; one or more light detectors each connected to at least one of the stretchable optical fibers and each configured to receive light signals emitted from the one or more light sources and transmitted by the stretchable optical fibers to which it is connected; and a control unit that receives inputs associated the received light signals from the one or more light detectors and that determines one or more deformation states of the second layer based on the received input.

Example 2 includes the subject matter of Example 1, further comprising a flexible printed circuit board, wherein the one or more light sources, the one or more light detectors, and the control unit are affixed to the flexible printed circuit board.

Example 3 includes the subject matter of any of Examples 1-2, wherein the flexible printed circuit board is configured to be affixed to an outer edge of the sensor device platform.

Example 4 includes the subject matter of any of Examples 1-3, the sensing device further comprising a power source affixed to the flexible printed circuit board such that the power source is coupled to the control unit.

Example 5 includes the subject matter of any of Examples 1-4, the power source comprising a rechargeable battery.

Example 6 includes the subject matter of any of Examples 1-5, the power source comprising a replaceable battery.

Example 7 includes the subject matter of any of Examples 1-6, wherein the inputs are associated with an intensity or a duration of the transmitted light signals.

Example 8 includes the subject matter of any of Examples 1-7, wherein the plurality of stretchable optical fibers comprise one or more elastomer materials configured to decrease an intensity of a transmitted light signal in response to an applied force.

Example 9 includes the subject matter of any of Examples 1-8, the control unit comprising a processor, the processor configured to: receive the inputs associated with the received light signals from the one or more light detectors; convert the inputs to pressure values associated with one or more locations on the second layer; generate a two-dimensional map of the pressure values associated with the locations on the second layer; and transmit, to an external computing device, the two-dimensional map.

Example 10 includes the subject matter of any of Examples 1-9, the control unit configured to: receive the inputs associated with the received light signals from the one or more light detectors; and transmit, to an external computing device, the inputs associated with the received light signals from the one or more light detectors.

Example 11 includes the subject matter of any of Examples 1-9, wherein the external computing device is configured to: receive, from the control unit, the inputs associated with the received light signals from the one or more light detectors; convert the inputs to pressure values associated with one or more locations on the second layer; and generate a two-dimensional map of the pressure values associated with the locations on the second layer.

Example 12 includes the subject matter of any of Examples 1-10, wherein one or more of the stretchable optical fibers deform as a result of a force being applied to one or more portions of the second layer.

Example 13 includes the subject matter of any of Examples 1-12, wherein the deformation of the one or more stretchable optical fibers comprises a cross-section of the one or more stretchable optical fibers changing from a circular cross-section to an elliptical cross-section.

Example 14 includes the subject matter of any of Examples 1-12, wherein an intensity of the received light signals is decreased when a portion of the second layer proximate to one or more stretchable optical fibers is deformed and an intensity of the received light signals returns to an initial intensity in an absence of a deformation.

Example 15 includes the subject matter of any of Examples 1-13, wherein the plurality of stretchable optical fibers is arranged in an array comprising one or more stretchable optical fibers arranged in a substantially parallel configuration.

Example 16 includes the subject matter of any of Examples 1-15, wherein the array is in close proximity to the second layer such that when a force is applied to the second layer a defect occurs at one or more of the stretchable optical fibers, the defect comprising a bend, a crease, or a dent in one or more of the stretchable optical fibers, and the defect causing a decrease in an intensity of the received light signals.

Example 17 includes the subject matter of any of Examples 1-15, wherein the plurality of stretchable optical fibers comprises a cladding around the stretchable optical fibers.

Example 18 includes the subject matter of any of Examples 1-17, wherein the plurality of stretchable optical fibers is arranged in two or more arrays, each array comprising one or more stretchable optical fibers.

Example 19 includes the subject matter of any of Examples 1-18, wherein each of the arrays comprises stretchable optical fibers arranged in a substantially parallel configuration.

Example 20 includes the subject matter of any of Examples 1-19, wherein a first array overlays a second array such that a longitudinal axis of each of the stretchable optical fibers of the first array is substantially perpendicular to and overlays a longitudinal axis of a stretchable fiber optic fiber of the second array to create a plurality of deformable data points.

Example 21 includes the subject matter of any of Examples 1-19, wherein the first array is in close proximity to the second array such that when a force is applied to the second layer a defect occurs at one or more of the deformable data points, the defect comprising a compression, a bend, a crease, or a dent in one or more stretchable optical fibers of the first array and/or one or more stretchable optical fibers of the second array.

Example 22 includes the subject matter of any of Examples 1-21, wherein the second layer moderates a deformation associated with the force such that the deformation results in a detectible change in an intensity of the received light signals from the one or more light detectors.

Example 23 includes the subject matter of any of Examples 1-22, wherein the plurality of deformable data points is arranged to correspond to a hallux, a metatarsal head, a midfoot, a condyle, or a combination thereof of a human foot.

Example 24 includes the subject matter of any of Examples 1-23, wherein the stretchable optical fibers of the first array comprise cladding around the stretchable optical fibers.

Example 25 includes the subject matter of any of Examples 1-24, further comprising a buffer structure disposed between the first layer and the second layer, the buffer structure configured to reduce a change in intensity of the received light signals from the one or more light detectors associated with a deformation of the second layer.

Example 26 includes the subject matter of any of Examples 1-25, the sensing device further configured to connect to one or more external power sources.

Example 27 includes the subject matter of any of Examples 1-25, wherein the plurality of stretchable optical fibers is comprised in an article of manufacture.

Example 28 includes the subject matter of any of Examples 1-27, wherein the sensor device platform comprises: a first portion of a material having been input into a bottom mold to form the first layer; the plurality of stretchable optical fibers inserted above the first portion of the material; and a second portion of the material having been input into the bottom mold on top of the plurality of stretchable optical fibers to form the second layer, wherein a top mold is affixed to the bottom mold such that the first portion and the second portion are compressed with the plurality of stretchable optical fibers disposed within.

Example 29 includes the subject matter of any of Examples 1-28, wherein the material is a silicone rubber or polyurethane foam-based material.

Example 30 includes the subject matter of any of Examples 1-29, wherein the material is initially heated and subsequently cooled.

Example 31 includes the subject matter of any of Examples 1-30, wherein the sensor device platform comprises the first layer bonded to the second layer with the plurality of stretchable optical fibers disposed between the first layer and the second layer, the first layer comprising a rigid, base layer and the second layer comprising a flexible material.

Example 32 includes the subject matter of any of Examples 1-31, wherein the first layer comprises one or more polymeric materials.

Example 33 includes the subject matter of any of Examples 1-32, wherein the one or more light sources are light emitting diodes.

Example 34 includes the subject matter of any of Examples 1-33, wherein the one or more light sources are lasers.

Example 35 includes the subject matter of any of Examples 1-34, wherein the one or more light detectors are photodiodes.

Example 36 includes the subject matter of any of Examples 1-35, wherein the one or more light detectors are photoconductors.

Example 37 includes the subject matter of any of Examples 1-36, wherein the sensing device is configured to be an insole to be inserted into a shoe.

Example 38 includes the subject matter of any of Examples 1-37, wherein the sensing device is configured to be a sock to be inserted into a shoe.

Example 39 includes the subject matter of any of Examples 1-38, wherein the sensing device is configured to measure pressure values on one or more parts of a foot including a hallux, a metatarsal head, a midfoot, a condyle, or a combination thereof.

Example 40 includes the subject matter of any of Examples 1-38, wherein the sensing device is a pressure sensing device, a force sensing device, a virtual reality device, or an augmented reality device.

Example 41 includes the subject matter of any of Examples 1-40, wherein the sensing device is configured to contact an appendage of a subject.

Example 42 includes the subject matter of any of Examples 1-40, wherein the subject is a human, a non-human animal, or a robot.

Example 43 is a method of determining a force applied by an appendage to a surface, comprising: contacting a first appendage with one or more portions of an exterior surface of a first sensing device, the first sensing device comprising: a first layer, a second layer, a plurality of stretchable optical fibers disposed between the first layer and the second layer, one or more light sources, each of the stretchable optical fibers being connected to at least one of the light sources, one or more light detectors, each connected to at least one of the stretchable optical fibers and each configured to receive light signals emitted from the one or more light sources and transmitted by the stretchable optical fibers, and a control unit that receives inputs associated with an intensity or duration of the received light signals from the one or more light detectors and that determines one or more deformation states of the second layer based on the received input; applying a force by the first appendage to the exterior surface of the first sensing device such that one or more portions of the second layer are deformed by the force and the intensity of the received light signals is decreased; determining, by the control unit, pressure values associated with the decrease in the intensity of the light signals based on a magnitude of the force applied by the first appendage; and transmitting, to an external computing device, the pressure values for one or more locations on the first appendage.

Example 44 includes the subject matter of Example 43 wherein the first sensing device is configured to determine one or more locations on the first appendage causing the deformation of the second layer.

Example 45 includes the subject matter of any of Examples 43-44, wherein the first sensing device is configured to generate a two-dimensional map of the pressure values associated with the force applied by the first appendage.

Example 46 includes the subject matter of any of Examples 43-45, further comprising: contacting a second appendage with one or more portions of an exterior surface of a second sensing device, the second sensing device comprising: a first layer, a second layer, a plurality of stretchable optical fibers disposed between the first layer and the second layer, one or more light sources, each of the stretchable optical fibers being connected to at least one of the light sources, one or more light detectors, each connected to at least one of the stretchable optical fibers and each configured to receive light signals emitted from the one or more light sources and transmitted by the stretchable optical fibers, and a control unit that receives inputs associated with an intensity or duration of the received light signals from the one or more light detectors and that determines one or more deformation states of the second layer based on the received input; and applying a force by the second appendage to the exterior surface of the second sensing device such that one or more portions of the second layer are deformed by the force and the intensity of the received light signals is decreased; determining, by the control unit, pressure values associated with the decrease in the intensity of the light signals based on a magnitude of the force applied by the second appendage; and transmitting, to the external computing device, the pressure values for one or more locations on the second appendage.

Example 47 includes the subject matter of any of Examples 43-46, wherein the first appendage is contacted with the exterior surface of the first sensing device and the second appendage is contacted with the exterior surface of the second sensing device while a subject is walking.

Example 48 includes the subject matter of any of Examples 43-47, further comprising determining, by the external computing device, the subject's gait or posture.

Example 49 includes the subject matter of any of Examples 43-48, further comprising calibrating the first sensing device based on one or more characteristics of a user.

Example 50 includes the subject matter of any of Examples 43-49, further comprising calibrating the second sensing device based on one or more characteristics of a user.

Example 51 includes the subject matter of any of Examples 43-50, wherein the first sensing device is an insole of a shoe in which a foot is disposed.

Example 52 includes the subject matter of any of Examples 43-51, wherein the second sensing device is an insole of a shoe in which a foot is disposed.

Statements

The following Statements describe various examples of sensors and methods, of the present disclosure and are not intended to be in any way limiting:

Statement 1. A sensor (e.g., a pressure sensor) comprising: a plurality of fiber optic fibers (e.g., one or more or all of which are stretchable fiber optic fibers); a first layer; a second layer; optionally, one or more buffer structure(s); one or more light source(s), wherein the individual fiber optic fibers are connected to a light source; one or more light detector(s), wherein the light detector(s) receives light emitted from the light source(s) that is transmitted by one or more of the plurality of fiber optic fibers; optionally, a control unit; and optionally, a power source and/or the sensor is configured to connect to one or more power source(s), wherein the plurality of fiber optic fibers is disposed between the first layer and the second layer.

A sensor is configured to determine one or more deformation state(s) (e.g., pressure states and the like) of the second layer.

A sensor is configured such that the intensity of light (such as, for example, optical light, IR light, and the like, or a combination thereof) transmitted by one or more fiber optic fiber(s) is decreased when a portion of the second layer proximate to the one or more fiber optic fiber(s) is deformed.

A sensor is configured such that the intensity of light (such as, for example, optical light, IR light, and the like, or a combination thereof) being transmitted through one or more fiber optic fiber(s) is decreased when a portion of the second layer proximate to the one or more fiber optic fiber(s) is deformed and the intensity of light (such as, for example optical light, IR light, and the like, or a combination thereof) transmitted by the one or more fiber optic fiber(s) returns to substantially (or its) intensity in the absence of the deformation.

A deformation or deformations results in a decrease of light transmission of about 1% to about 99%, including all 0.1% values and ranges therebetween, of one or more light wavelength(s) (such as, for example, optical light wavelength(s), IR light wavelength(s), or the like, or a combination thereof) relative to the light transmission in the absence of one or more deformation(s).

A sensor comprises a plurality of fiber optic fibers where none of the fiber optic fibers overlay another fiber optic fiber. In various examples, a sensor comprises a plurality of fiber optic fibers where at least a portion of or all the fiber optic fibers overlay another fiber optic fiber.

A sensor comprises a plurality of fiber optic fibers arranged in a one-dimensional array. In various examples, the one-dimensional array comprises a plurality of substantially parallel fibers.

A sensor comprises a first fiber optic fiber and a second fiber optic fiber. In various examples, a first fiber optic fiber overlays (e.g., is in proximity to, is in contact with, or the like) a second fiber optic fiber. In various examples, a first fiber optic fiber (which may be a part of a first layer of fiber optic fibers), overlays (e.g., is in proximity to, is in contact with, or the like) a second optic fiber (which may be a part of a first layer of fiber optic fibers). In various examples, an angle between (or an angle formed by) the longest axis of independent pairs of overlaying fibers is greater than zero and less than about 180 degrees (e.g., about 80 to about 100 degrees, such as, for example, about 90 degrees), including all 0.1 degree values and ranges therebetween.

One of the fiber optic fibers (which may be closer to or farther from the second layer than the other fiber) comprise a cladding (over at least a portion of the fiber optic fiber that overlaps with the other fiber optic fiber) and the other fiber does not comprise a cladding (over at least a portion of the other fiber optic fiber that overlaps with the other fiber optic fiber).

A first fiber optic fiber (which may be a part of a first layer of fiber optic fibers), is in proximity to a second fiber optic fiber (which may be a part of a second layer of fiber optic fibers) such that, for example, a deformation/deformations causes a change (e.g., attenuation or the like) of the light being transmitted by the first fiber optic fiber, second fiber optic fiber, or a plurality of the plurality of fiber optic fibers. In various examples, the change in light being transmitted is caused by a defect/defects (e.g., a bend, a crease, a dent, or the like) in the first fiber optic fiber, second fiber optic fiber, or a plurality of the plurality of fiber optic fibers resulting from the deformation(s).

One or more fiber optic fiber(s) provide a deformation data point (which may be referred to as a pressure data point). In various examples, two or more fiber optic fibers, which may have various relative orientations, provide a deformation data point (which may be referred to as a pressure data point). In various examples, two overlaying fiber optic fibers provide a deformation data point (which may be referred to as a pressure data point). In various examples, a deformation data point, on deformation, provides one or more change(s) in the intensity of light (such as, for example optical light, IR light, and the like, or a combination thereof) transmitted the one or more fiber optic fiber(s) and, optionally, the duration of one or more (or all) of the intensity change(s).

A sensor comprises one or more deformation data point(s). A deformation data point may be disposed anywhere relative to the first layer and/or second layer. In the case of a plurality of deformation data points, in various examples, the deformation data points are arranged in a desired pattern (e.g., a uniformly distributed pattern).

A deformation data point or deformation data points is/are arranged to correspond to a hallux, a metatarsal head, a midfoot, a condyle, or the like, or a combination thereof, of a human foot.

The sensor is flexible and/or breathable and/or waterproof.

A variety of fiber optic fibers can be used. In various examples, combinations of fiber optic fibers are used. A fiber optic fiber may be alternatively referred to as an optical fiber or a waveguide. In various examples, a fiber optic fiber is a flexible fiber optic fiber. In various examples, a fiber optic fiber comprises or does not comprise a cladding. In various examples, each fiber optic fiber comprises a cladding. Suitable fiber optic fibers are known in the art.

A fiber optic fiber transmits (or is configured to transmit) one or more optical and/or infrared wavelength(s). In various examples, a fiber optic fiber transmits (or is configured to transmit) electromagnetic radiation having one or more wavelength(s) in the range of 400 nm to 50 microns (e.g., 600 nm to 10 microns), including all nm values and ranges therebetween.

A fiber optic fiber is a stretchable fiber optic fiber. A variety of stretchable fiber optic fibers can be used. In various examples, a combination of different stretchable optical fibers is used. In various examples, a combinations of fiber optic fiber(s) and stretchable optical fiber(s) are used. A stretchable fiber optic fiber may be alternatively referred to as a stretchable optical fiber or a stretchable waveguide. In various examples, a stretchable fiber optic fiber comprises a cladding. In any of the examples and embodiments described herein, unless otherwise stated, the fiber optic fiber may be a stretchable fiber optic fiber or one or more or all of the fiber optic fibers may be stretchable fiber optic fibers. Suitable stretchable fiber optic fibers are known in the art. Non-limiting examples of stretchable fiber optic fibers are found in International Publication Nos. WO2017147573 A1, WO2019108861 A1, and WO2019108862 A1, the disclosures of which with regard to fiber optic fibers are incorporated herein by reference.

One or more stretchable fiber optic fiber(s) are used in an article of manufacture (such as, for example, a garment (e.g., a pressure-sensing garment, or the like)). In various examples, a sock comprises one or more or all stretchable fiber optic fibers.

The fiber optic fibers are electromagnetic immune (EMI) or susceptible and/or chemically inert and/or chemically stable.

The fiber optic fibers are configured to detect deformation(s) (e.g., be pressure data points) of one or more portions of, substantially all, or all of the first layer and/or second layer.

The fiber optic fibers lie in substantially a single plane (e.g., a single plane). In various other examples, the fiber optic fibers lie in a plurality of substantially single planes (e.g., single planes), one or more or all of which may be offset relative to one or more or all of the other planes, wherein each plane lies normal to the first layer and/or second layer.

The plurality of fiber optic fibers comprise a plurality of first fiber optic fibers, which may be substantially parallel to each other and lie substantially in first plane that may be closer to the first layer than the second plane, and a plurality of second fiber optic fibers, which may be substantially parallel to each other and lie substantially in second plane that may be closer to the second plane than the first plane, where the first plane and second plane fall on an axis perpendicular to the longest axis of the first layer and/or second layer. In various examples, at least a portion of the plurality of second fiber optic fibers comprise a cladding.

A first layer is rigid. In various examples, a first layer is a base layer. In various examples, a first layer (e.g., a base layer) provides support for applied pressure to deform the fiber optic fibers. In various examples, a first layer (e.g., a base layer) is formed from materials typically used for shoe midsole materials. In various examples, the materials are relatively heavy, dense, rigid, and durable compared to insole materials. In various examples, a first layer (e.g., a base layer) comprises (or is formed from) one or more polymeric material(s). Non-limiting examples of polymeric materials include elastomers (such as, for example, ethylene-vinyl acetate (EVA) copolymers, polyurethanes (PU), and the like, and combinations thereof), thermoplastic polyurethanes (TPU), rubbers, carbon, nylons, plastics, and the like, and combinations thereof.

A second layer is deformable. In various examples, a second layer is (e.g., is molded to) guide fiber optics and/or to control the pressure applied to the sensor(s) (e.g., foot pressure or the like). In various examples, a second layer moderates the deformation (e.g., the pressure applied by, for example, a foot or the like) such that the deformation results in a detectible (e.g., measurable) change in light transmission of one or more fiber optic fiber(s). In various examples, a user considers the second layer comfortable. In various examples, a second layer is a cover layer or an insole layer. In various examples, a second layer (e.g., a cover layer or insole layer) is formed from materials typically used for shoe insole materials. In various examples, the second layer (e.g., a cover layer or insole layer) comprises (or is formed from) material(s) that are softer and/or more flexible than those used for the first layer (e.g., base layer). In various examples, a second layer (e.g., a cover layer or insole layer) comprises (or is formed from) one or more polymeric material(s). Non-limiting examples of second layer (e.g., cover layer or insole layer) materials include elastomers (such as, for example, ethylene-vinyl acetate (EVA) copolymers, and the like, and combinations thereof), polyethylenes, polyesters, polyvinyl chlorides, nylons, spandexes, wools, neoprene sponges, latexes, leathers, natural fibers (such as for example, cotton and the like), corks, gels, and the like, and combinations thereof.

In the case of articles of manufacture (such as, for example, garments (e.g., pressure-sensing garments) or the like, in various examples, the sensor(s) comprise(s) one or more yarn(s), independently, formed from cotton, polyester, nylon, wool, spandex, or the like, or a combination thereof. In various examples, a sock comprises cotton, polyester, nylon, wool, spandex, or the like, or a combination thereof.

A buffer structure or buffer structures are configured to prevent total loss of light (such as, for example, optical light, IR light, or the like, or a combination thereof) due to deformation of the second layer and/or physical damage to the fiber optic fibers. In various examples, a buffer structure is disposed between one or more or all of the plurality of fiber optic fibers and the second layer. In various examples, a buffer structure is a buffer block. In various examples, a buffer structure or buffer structures are part of (e.g., integrated with) a second layer. In various examples, a buffer structure comprises (or is formed from) one or more second layer material(s).

Various light sources can be used. In various examples, a light source is an optical light and/or IR light source. Non-limiting examples of light sources (e.g., optical light and/or IR light sources or the like) include light emitting diodes, lasers, and the like, and combinations thereof.

Various light detectors can be used. In various examples, a detector is an optical light and/or IR light detector. Non-limiting examples of light detectors (e.g., optical light and/or IR light detectors) include photodiodes, photoconductors, and the like, and combinations thereof.

A sensor comprises a connector independently connecting each fiber optic fiber and each light source or light detector. In various examples, a connector is a cap and is a 3D-printed, rigid, and cylinder-shaped cap with two holes (small one for fiber optic, large one for the light source or light detector). Various connector shapes/structures can be used depending on the fiber optic fibers, light sources, and light detectors used.

A control unit controls the light (e.g., optical and/or IR light or the like), converts the light (e.g., optical and/or IR light or the like) intensity(ies) to voltage(s), and the like, or a combination thereof. In various examples, a control unit receives an input or inputs representing the light received by the light detector(s) (e.g., optical light and/or IR light detectors or the like), and communicate (e.g., to a processor, external device, or the like) light (e.g., optical light and/or IR light or the like), information, such as, for example, light information representing light intensity, duration of light intensity, or the like, or a combination thereof. In various examples, the control unit converts an intensity/intensities of light (e.g., optical light and/or IR light or the like), received by the light detector(s) (e.g., optical light and/or IR light detectors or the like), to voltage(s) before communicating the light information (e.g., optical light and/or IR light information). In various examples, the communication is wireless communication (e.g., via Bluetooth transmission or the like). In various examples a controller is a microcontroller. In various examples, a control unit comprises a processor (e.g., a processor that determines pressure(s) (may convert an intensity/intensities of light (e.g., optical light and/or IR light or the like, received by the light detector(s) (e.g., optical light and/or IR light detectors or the like), to voltage(s) that is/are used to determine pressure) at one or more location on the second layer based on the light information (e.g., optical light and/or IR light information or the like), received from the control unit).

Various power sources can be used. In various examples, a power source is coupled to a control unit/control unit(s). In various examples, a power source is one or more batter(ies). Non-limiting examples of batteries include non-rechargable batteries and rechargeable batteries. Suitable examples of batteries are known in the art.

A sensor is (or is part of) an insole, a sock, a mat, or the like.

Statement 2. A sensor according to claim 1, wherein the plurality of fiber optic fibers comprises a first fiber optic fiber and a second fiber optic fiber, wherein the first fiber optic fiber is disposed between the second layer and the second fiber optic fiber and the second fiber optic fiber is disposed between the first fiber optic fiber and the first layer, and wherein a longitudinal axis of the first fiber optic fiber is substantially perpendicular to and overlaps with a longitudinal axis of the second fiber optic fiber.

By "substantially perpendicular" it is meant that a longitudinal axis of the first fiber optic fiber and a longitudinal axis of the second fiber optic fiber form an angle of 80 degrees to 100 degrees, including all 0.1 degree values therebetween.

Statement 3. A sensor according to claim 1 or claim 2, wherein the plurality of fiber optic fibers comprises a first layer of fiber optic fiber(s) and a second layer of fiber optic fiber(s), wherein a longitudinal axis of each of the fiber optic fiber(s) of the first layer is substantially perpendicular to and overlays a longitudinal axis of a fiber optic fiber of the second layer.

By "substantially perpendicular" it is meant that a longitudinal axis of a first fiber optic fiber and a longitudinal axis of the second fiber optic fiber proximate to (or nearest to) the first fiber optic fiber form an angle of about 80 degrees to about 100 degrees, including all 0.1 degree values therebetween.

Statement 4. A sensor according to any one of claims 1-3, wherein the first layer is a shoe insole layer; the plurality of fiber optic fibers is arranged in a first layer and a second layer on the shoe insole layer, the first layer of fiber optic fibers overlaying the second layer of fiber optic fibers; the second layer is a shoe insole top layer disposed on top of the first layer of fiber optic fibers; optionally, the power source is a battery (such as for example, a rechargeable battery or the like); and optionally, each fiber optic fiber in the first layer comprises a cladding disposed around the fiber optic fiber.

Statement 5. A method of determining a force applied by an appendage (e.g., a first appendage) (e.g., a foot, a hand, or the like) of a subject to a surface comprising: contacting (directly or indirectly) the appendage with an exterior surface of the second layer of a first sensor of the present disclosure (e.g., a sensor of any one of the preceding claims) such that a portion of the second layer is deformed and the intensity of light (such as, for example optical light, IR light, and the like, or a combination thereof) transmitted by the one or more fiber optic fibers proximate the deformation is decreased, wherein the decrease in the intensity of the light (such as, for example optical light, IR light, and the like, or a combination thereof) correlates to the force applied to the surface by the appendage.

A subject is a human or a non-human animal or other animal. In various examples, a subject is a mammal. In various examples, a subject is an agricultural mammal, a pet, a service animal, or the like. Non-limiting examples of non-human mammals include cows, pigs, goats, mice, rats, rabbits, cats, dogs, and the like. In various examples, a subject is a robot.

Statement 6. A method according to claim 5, wherein the sensor is configured to determine the portion of the appendage causing the deformation of the second layer.

Statement 7. A method according to any one of claim 5 or 6, further comprising contacting (directly or indirectly) a second appendage (e.g., a second foot, a second hand, or the like) of the subject with an exterior surface of the second layer of the sensor such that a portion of the second layer is deformed and the intensity of the light (such as, for example optical light, IR light, and the like, or a combination thereof) transmitted by the one or more fiber optic fibers proximate to the deformation is decreased, wherein the decrease in the intensity of the light (such as, for example optical light, IR light, and the like, or a combination thereof) correlates to the force applied to the surface by the second appendage, or an exterior surface of a second sensor of any one of the preceding claims such that a portion of the second layer of the second sensor is deformed and the intensity of light (such as, for example optical light, IR light, and the like, or a combination thereof) transmitted by the one or more fiber optic fibers proximate the deformation is decreased.

Statement 8. A method according to any one of claims 5-7, wherein the sensor provides a two-dimensional map of the pressure applied by the appendage (e.g., foot, hand, or the like).

Statement 9. A method according to any one of claims 5-8, wherein the first appendage (e.g., a second foot, a second hand, or the like) is contacted with the exterior surface of the second layer of the first sensor and/or second appendage (e.g., a second foot, a second hand, or the like) is contacted with the exterior surface of the second layer of the second sensor while the subject is walking.

Statement 10. A method according to any one of claims 5-9, further comprising calibrating at least one sensor (or all of the sensors).

Statement 11. A method according to any one of claims 5-10, wherein the sensor is an insole of a shoe in which the foot is disposed.

Statement 12. A method according to any one of claims 5-11, wherein the subject's gait, posture, or the like, or a combination thereof, is/are determined.

Statement 13. An article of manufacture comprising one or more sensor(s) of the present disclosure (e.g., a sensor of any of claims 1-4, or a combination thereof).

Statement 14. An article of manufacture according to claim 13, wherein the article of manufacture is a shoe, an insole, a film, a garment (such as, for example, a sock, a hand cover, such as for example, a glove and the like), a knee cover, an elbow cover, or the like), a mat, or the like.

A garment is a pressure-sensing or force-sensing garment.

Statement 15. A device comprising one or more sensor(s) of the present disclosure e.g., a sensor of any of claims 1-4, or a combination thereof) and/or one or more article(s) of manufacture of the present disclosure (e.g., an article of manufacture of any of claims 13, 14, or a combination thereof).

Statement 16. A device according to claim 15, wherein the device is a pressure-sensing device, a force-sensing device, a virtual reality device, an augmented reality device, or the like.

A device is a pressure/force sensing film, a pressure sensing garment or accessory (e.g., for a knee, a hand, an elbow, or the like), a virtual/augmented reality device, foot pressure sensing device (e.g., for animals, robots, or the like.

What is claimed is:

1. A sensing device, comprising:
a first layer;
a second layer;
a sensor device platform comprising a plurality of stretchable optical fibers disposed between the first layer and the second layer, wherein the plurality of stretchable optical fibers comprise one or more elastomer materials;
one or more light sources, each of the stretchable optical fibers being connected to at least one of the light sources;
one or more light detectors each connected to at least one of the stretchable optical fibers and each configured to receive light signals emitted from the one or more light sources and transmitted by the stretchable optical fibers;
a control unit that receives inputs associated with the received light signals from the one or more light detectors and that determines one or more deformation states of the second layer based on the received input;
a printed circuit board, wherein the one or more light sources, the one or more light detectors, and the control unit are affixed to the printed circuit board; and
a power source affixed to the printed circuit board such that the power source is coupled to the control unit.

2. The sensing device of claim 1, wherein the printed circuit board is configured to be affixed to an outer edge of the sensor device platform.

3. The sensing device of claim 1, the power source comprising a rechargeable battery or a replaceable battery.

4. The sensing device of claim 1, wherein the inputs are associated with an intensity or a duration of the transmitted light signals.

5. The sensing device of claim 1, wherein the plurality of stretchable optical fibers comprise one or more elastomer materials configured to decrease an intensity of a transmitted light signal in response to an applied force.

6. The sensing device of claim 1, the control unit comprising a processor or communicating with an external computing device, wherein the processor or the external computing device is configured to:
receive the inputs associated with the received light signals from the one or more light detectors;
convert the inputs to pressure values associated with one or more locations on the second layer; and
generate a two-dimensional map of the pressure values associated with the locations on the second layer.

7. The sensing device of claim 1, wherein one or more of the stretchable optical fibers deform as a result of a force being applied to one or more portions of the second layer and wherein the deformation of the one or more stretchable optical fibers comprises a cross-section of the one or more stretchable optical fibers changing from a circular cross-section to an elliptical cross-section.

8. The sensing device of claim 1, wherein the plurality of stretchable optical fibers is arranged in an array comprising one or more stretchable optical fibers arranged in a substantially parallel configuration and wherein the array is in close proximity to the second layer such that when a force is applied to the second layer a defect occurs at one or more of the stretchable optical fibers, the defect comprising a bend, a crease, or a dent in one or more of the stretchable optical fibers, and the defect causing a decrease in an intensity of the received light signals.

9. The sensing device of claim 1, wherein the plurality of stretchable optical fibers is arranged in two or more arrays, each array comprising one or more stretchable optical fibers and wherein a first array overlays a second array such that a longitudinal axis of each of the stretchable optical fibers of the first array is substantially perpendicular to and overlays a longitudinal axis of a stretchable fiber optic fiber of the second array to create a plurality of deformable data points.

10. The sensing device of claim 9, wherein the first array is in close proximity to the second array such that when a force is applied to the second layer a defect occurs at one or more of the deformable data points, the defect comprising a compression, a bend, a crease, or a dent in one or more stretchable optical fibers of the first array and/or one or more stretchable optical fibers of the second array; and wherein the second layer moderates a deformation associated with the force such that the deformation results in a detectible change in an intensity of the received light signals from the one or more light detectors.

11. The sensing device of claim 1, further comprising a buffer structure disposed between the first layer and the second layer, the buffer structure configured to reduce a change in intensity of the received light signals from the one or more light detectors associated with a deformation of the second layer.

12. The sensing device of claim 1, the sensing device further configured to connect to one or more external power sources.

13. The sensing device of claim 1, wherein the sensor device platform comprises:
a first portion of a material having been input into a bottom mold to form the first layer;
the plurality of stretchable optical fibers inserted above the first portion of the material; and
a second portion of the material having been input into the bottom mold on top of the plurality of stretchable optical fibers to form the second layer, wherein a top mold is affixed to the bottom mold such that the first portion and the second portion are compressed with the plurality of stretchable optical fibers disposed within.

14. The sensing device of claim 13, wherein the material is a silicone rubber or polyurethane foam-based material.

15. The sensing device of claim 1, wherein the sensor device platform comprises the first layer bonded to the second layer with the plurality of stretchable optical fibers disposed between the first layer and the second layer, the first layer comprising a rigid, base layer and the second layer comprising a flexible material.

16. The sensing device of claim 1, wherein the sensing device is configured to be an insole to be inserted into a shoe or a sock to be inserted into a shoe.

17. The sensing device of claim 1, wherein one or more of the stretchable optical fibers deform in response to a motion of a subject and are configured to detect a force and one or more pressure values associated with one or more locations of a subject in motion.

18. The sensing device of claim 1, wherein the sensing device is configured to measure pressure values on one or more parts of a foot including a hallux, a metatarsal head, a midfoot, a condyle, or a combination thereof.

19. The sensing device of claim 1, wherein the sensing device is a pressure sensing garment, a force sensing garment, a virtual reality device, or an augmented reality device.

20. The sensing device of claim 1, wherein the sensing device is configured to contact an appendage of a subject and wherein the subject is a human, a non-human animal, or a robot.

* * * * *